US011206768B2

(12) United States Patent
Millar et al.

(10) Patent No.: US 11,206,768 B2
(45) Date of Patent: *Dec. 28, 2021

(54) SYSTEMS AND METHODS FOR PROVIDING AN INDUSTRIAL CART IN A GROW POD

(71) Applicant: Grow Solutions Tech LLC, Vineyard, UT (US)

(72) Inventors: Gary Bret Millar, Highland, UT (US); Mark Gerald Stott, Eagle Mountain, UT (US); Todd Garrett Tueller, American Fork, UT (US); Michael Stephen Hurst, Farmington, UT (US); Alan Ray Bentley, Alpine, UT (US); Taylor John Woodbury, Provo, UT (US); Shane York, Morgan, UT (US)

(73) Assignee: Grow Solutions Tech LLC, Vineyard, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/782,566

(22) Filed: Feb. 5, 2020

(65) Prior Publication Data

US 2020/0170195 A1 Jun. 4, 2020

Related U.S. Application Data

(63) Continuation of application No. 15/934,436, filed on Mar. 23, 2018, now Pat. No. 10,602,676.
(Continued)

(51) Int. Cl.
*A01G 9/14* (2006.01)
*B61L 23/34* (2006.01)
(Continued)

(52) U.S. Cl.
CPC ............... *A01G 9/143* (2013.01); *B60L 5/04* (2013.01); *B61B 13/02* (2013.01);
(Continued)

(58) Field of Classification Search
CPC ......... A01G 9/143; A01G 31/042; B60L 5/04; B60L 2200/44; B61B 13/02; B61B 13/00;
(Continued)

(56) References Cited

U.S. PATENT DOCUMENTS

| 3,913,758 | A | | 10/1975 | Faircloth et al. | |
|---|---|---|---|---|---|
| 5,824,891 | A | * | 10/1998 | Monson | B60C 23/043 73/146.5 |

(Continued)

FOREIGN PATENT DOCUMENTS

| CN | 102860226 A | 1/2013 |
|---|---|---|
| CN | 105636883 A | 6/2016 |

(Continued)

OTHER PUBLICATIONS

International Search Report and Written Opinion of the International Searching Authority, dated Jun. 14, 2018, PCT.
(Continued)

*Primary Examiner* — Paula L Schneider
(74) *Attorney, Agent, or Firm* — Dinsmore & Shohl, LLP

(57) ABSTRACT

A cart having a wheel and a cart-computing device communicatively coupled to the wheel, where the cart-computing device receives an electrical signal via the wheel. The electrical signal comprises a communication signal and electrical power. The communication signal corresponds to one or more instructions for controlling an operation of the cart and the electrical power of the electrical signal powers the cart-computing device.

20 Claims, 10 Drawing Sheets

Related U.S. Application Data

(60) Provisional application No. 62/519,316, filed on Jun. 14, 2017, provisional application No. 62/519,304, filed on Jun. 14, 2017, provisional application No. 62/519,326, filed on Jun. 14, 2017.

(51) Int. Cl.
| | |
|---|---|
| *G05D 1/00* | (2006.01) |
| *B60L 5/04* | (2006.01) |
| *B61L 15/00* | (2006.01) |
| *G05B 19/418* | (2006.01) |
| *B61B 13/02* | (2006.01) |
| *G05B 19/042* | (2006.01) |
| *B61B 13/00* | (2006.01) |
| *A01G 31/04* | (2006.01) |

(52) U.S. Cl.
CPC ........... *B61L 15/0027* (2013.01); *B61L 23/34* (2013.01); *G05B 19/042* (2013.01); *G05B 19/4189* (2013.01); *G05D 1/0027* (2013.01); *A01G 31/042* (2013.01); *B60L 2200/44* (2013.01); *B61B 13/00* (2013.01); *B61L 2201/00* (2013.01); *B61L 2210/02* (2013.01); *G05B 2219/2641* (2013.01); *G05D 2201/0216* (2013.01)

(58) Field of Classification Search
CPC .. B61L 15/0027; B61L 23/34; B61L 2201/00; B61L 2210/02; G05B 19/042; G05B 19/4189; G05B 2219/2641; G05D 1/0027; G05D 2201/0216; G05D 1/0022; G05D 1/0289; Y02P 60/21; Y02P 90/02; Y02P 90/60; Y02A 40/25; Y02T 90/16

USPC .......................................................... 701/19
See application file for complete search history.

(56) References Cited

U.S. PATENT DOCUMENTS

| | | | |
|---|---|---|---|
| 8,038,022 B2* | 10/2011 | Yao | ......................... B61C 13/00 |
| | | | 213/75 R |
| 9,139,207 B2 | 9/2015 | Benish et al. | |
| 2005/0217172 A1 | 10/2005 | Korte et al. | |
| 2007/0256356 A1 | 11/2007 | Kap | |
| 2008/0316029 A1* | 12/2008 | Hannah | ................... B62B 5/048 |
| | | | 340/568.5 |
| 2011/0079167 A1* | 4/2011 | Yao | ......................... B61G 5/10 |
| | | | 105/1.4 |
| 2016/0297610 A1* | 10/2016 | Grosse | ..................... B60M 1/34 |
| 2018/0015823 A1* | 1/2018 | Wu | ............................ B60C 1/00 |

FOREIGN PATENT DOCUMENTS

| | | | |
|---|---|---|---|
| EP | 2591559 A2 | 5/2013 | |
| EP | 2644025 A1 | 10/2013 | |
| EP | 2633751 B1 | 1/2015 | |

OTHER PUBLICATIONS

Office Action Issued in corresponding CN Application No. 201880003447.0, dated May 6, 2021.

Examination Report Issued in corresponding SA Application No. 519401231, dated Jun. 28, 2021.

* cited by examiner

SYSTEMS AND METHODS FOR PROVIDING AN INDUSTRIAL CART IN A GROW POD

CROSS-REFERENCE TO RELATED APPLICATIONS

This application is a continuation of U.S. patent application Ser. No. 15/934,436 entitled "SYSTEMS AND METHODS FOR PROVIDING AN INDUSTRIAL CART FOR A GROW POD," filed on Mar. 23, 2018, which claims the benefit of U.S. Provisional Application No. 62/519,304, entitled "SYSTEMS AND METHODS FOR PROVIDING AN ASSEMBLY LINE GROW POD" filed Jun. 14, 2017, the benefit of U.S. Provisional Application No. 62/519,326, entitled "SYSTEMS AND METHODS FOR PROVIDING AN INDUSTRIAL CART FOR A GROW POD" filed Jun. 14, 2017, and the benefit of U.S. Provisional Application No. 62/519,316, entitled "SYSTEMS AND METHODS FOR COMMUNICATING WITH AN INDUSTRIAL CART" filed Jun. 14, 2017, the entirety of which are hereby incorporated by reference in their entireties.

TECHNICAL FIELD

Embodiments described herein generally relate to systems and methods for providing an industrial cart for a grow pod and, more specifically, to industrial carts in an assembly line configuration of a grow pod.

BACKGROUND

While crop growth technologies have advanced over the years, there are still many problems in the farming and crop industry today. As an example, while technological advances have increased efficiency and production of various crops, many factors may affect a harvest, such as weather, disease, infestation, and the like. Additionally, certain countries, regions and/or populations may not have suitable farmland to grow particular crops.

Currently, greenhouses and grow houses utilize stationary trays for growing plants. This typically requires large amounts of floor space because workers must be able to access the trays in order to water and otherwise tend to the plants while they are growing. For example, stationary trays in greenhouses need to be periodically rotated or relocated so the plants growing within them receive the required amount of light and/or exposure to environmental conditions such as humidity or airflow. Consequently, greenhouses must provide additional floor space for workers to carry out these tasks and may be limited by the vertical reach of the worker. Greenhouses and grow houses are only an example where a facility needs to accommodate access to stationary objects from time to time by a worker. Other environments, such as warehouses, fulfillment centers or the like must also utilize large amounts of floor space and may be vertically limited by the height of their workers.

As such, a need exists to improve environments such as greenhouses and grow houses, which can reduce the amount of direct worker interaction with stationary objects, such as a plant during the growing process and remove limitations on the use of large floor spaces and relatively small vertical elevations for growing plants.

SUMMARY

In one embodiment, a cart includes a wheel, a drive motor coupled to the wheel such that an output of the drive motor causes the wheel to rotate and propel the cart, a cart-computing device communicatively coupled to the drive motor, and one or more sensors communicatively coupled to the cart-computing device, the one or more sensors generating one or more signals in response to a detected event. The cart-computing device receives a communication signal and electrical power via the wheel. The communication signal corresponds to one or more instructions for controlling an operation of the cart. The cart-computing device receives the one or more signals from the one or more sensors. The cart-computing device generates and transmits a control signal to the drive motor to cause the drive motor to operate based on at least one of the one or more signals generated by the one or more sensors or the communication signal.

In some embodiments, a system includes a track, a master controller communicatively coupled to the track, and a plurality of carts supported on the track. At least one cart of the plurality of carts includes a wheel supported on the track and electrically coupled to the track, a drive motor coupled to the wheel such that an output of the drive motor causes the wheel to rotate and propel the at least one cart along the track, a cart-computing device communicatively coupled to the drive motor, and one or more sensors communicatively coupled to the cart-computing device, the one or more sensors generating one or more signals in response to a detected event. The cart-computing device receives, via the track and the wheel, a communication signal transmitted from the master controller and electrical power. The communication signal, generated by the master controller, corresponds to one or more instructions for controlling an operation of the at least one cart. The cart-computing device receives the one or more signals from the one or more sensors. The cart-computing device generates and transmits a control signal to the drive motor to cause the drive motor to operate based on at least one of the one or more signals or the communication signal.

In some embodiments, a system includes a track having an ascending portion coupled to a descending portion by a connection portion wherein the ascending portion wraps around a first axis and the descending portion wraps around a second axis, and at least one electrically conductive rail. The system further includes a master controller communicatively coupled to at least one electrically conductive rail of the track; and a plurality of carts. Each one of the plurality of carts includes one or more wheels supported on the track and electrically coupled to the at least one electrically conductive rail of the track, a drive motor coupled to the one or more wheels such that an output of the drive motor causes the one or more wheel to rotate and propel the cart along the track, a cart-computing device communicatively coupled to the drive motor, and one or more sensors communicatively coupled to the cart-computing device, the one or more sensors generating one or more signals in response to a detected event. The cart-computing device receives both a communication signal transmitted from the master controller and electrical power propagating over the track and through the one or more wheels. The communication signal, generated by the master controller, corresponds to one or more instructions for controlling an operation of the plurality of carts. The cart-computing device of each cart of the plurality of carts receives the one or more signals from the one or more sensors. The cart-computing device of each cart of the plurality of carts generates and transmits a control signal to the drive motor to cause the drive motor to operate based on at least one of the one or more signals generated by the one or more sensors or the communication signal.

In some embodiments, a cart having a wheel and a cart-computing device communicatively coupled to the wheel, where the cart-computing device receives an electrical signal via the wheel. The electrical signal comprises a communication signal and electrical power. The communication signal corresponds to one or more instructions for controlling an operation of the cart and the electrical power of the electrical signal powers the cart-computing device.

In some embodiments, a system includes a track, a master controller communicatively coupled to the track, and a plurality of carts supported on the track. At least one cart of the plurality of carts includes a wheel supported on the track and electrically coupled to the track and a cart-computing device communicatively coupled to the wheel. The cart-computing device receives, via the track and the wheel, an electrical signal wherein the electrical signal comprises a communication signal transmitted from the master controller and electrical power. The communication signal, generated by the master controller, corresponds to one or more instructions for controlling an operation of the at least one cart and the electrical power of the electrical signal powers the cart-computing device.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein generally include systems and methods for providing one or more industrial carts in an assembly line configuration of a grow pod. Some embodiments are configured such that an industrial cart supporting a payload travels on a track of a grow pod to provide sustenance (such as light, water, nutrients, etc.) to seeds and/or plants included in the payload on the industrial cart. The industrial cart may be among one or more other industrial carts arranged on the track of the grow pod to create an assembly line of industrial carts.

Figure 1:
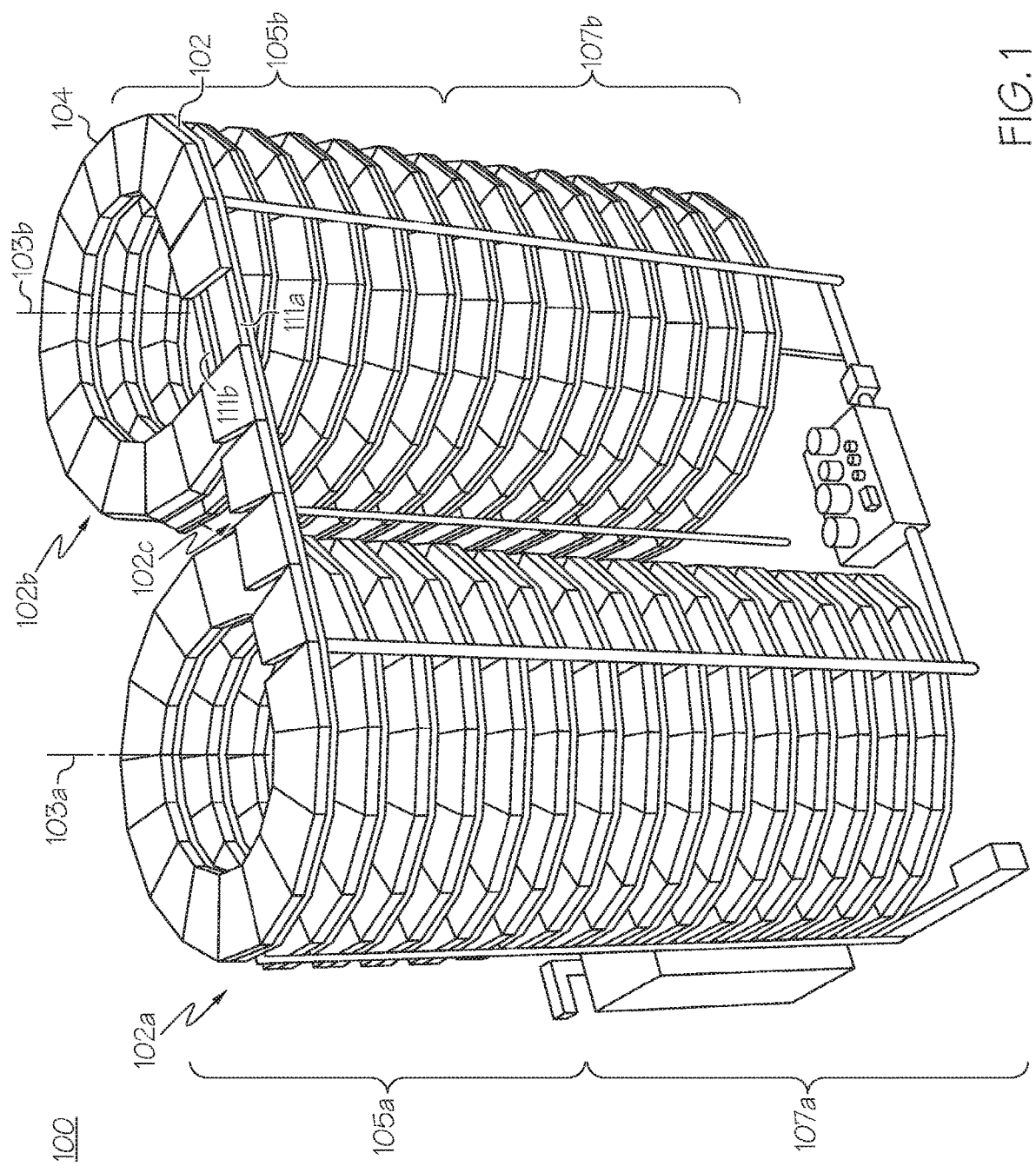
FIG. 1 depicts an illustrative assembly line grow pod that includes a plurality of industrial carts according to embodiments described herein.

Referring now to the drawings, FIG. 1 depicts an illustrative assembly line grow pod 100 that includes a plurality of industrial carts 104. As illustrated, the assembly line grow pod 100 includes a track 102 that supports one or more industrial carts 104. Each of the one or more industrial carts 104, as described in more detail with reference to at least FIG. 3, may include one or more wheels 222a-222d (collectively, referred to as 222) rotatably coupled to the industrial cart 104 and supported on the track 102.

The track 102 may include an ascending portion 102a, a descending portion 102b, and a connection portion 102c. The ascending portion 102a may be coupled to the descending portion 102b via the connection portion 102c. The track 102 may wrap around (e.g., in a counterclockwise direction as depicted in FIG. 1) a first axis 103a such that the industrial carts 104 ascend upward in a vertical direction. The connection portion 102c may be relatively level and straight (although these are not requirements). The connection portion 102c is utilized to transfer the industrial carts 104 from the ascending portion 102a to the descending portion 102b. The descending portion 102b may be wrapped around a second axis 103b (e.g., in a counterclockwise direction as depicted in FIG. 1) that is substantially parallel to the first axis 103a, such that the industrial carts 104 may be returned closer to ground level. Each of the ascending portion 102a and the descending portion 102b includes an upper portion 105a and 105b, respectively, and a lower portion 107a and 107b, respectively. In some embodiments, a second connection portion (not shown in FIG. 1) may be positioned near ground level that couples the descending portion 102b to the ascending portion 102a such that the industrial carts 104 may be transferred from the descending portion 102b to the ascending portion 102a. Similarly, some embodiments may include more than two connection portions 102c to allow different industrial carts 104 to travel different paths. As an example, some industrial carts 104 may continue traveling up the ascending portion 102a, while some may take one of the connection portions 102c before reaching the top of the assembly line grow pod 100.

Figure 2:
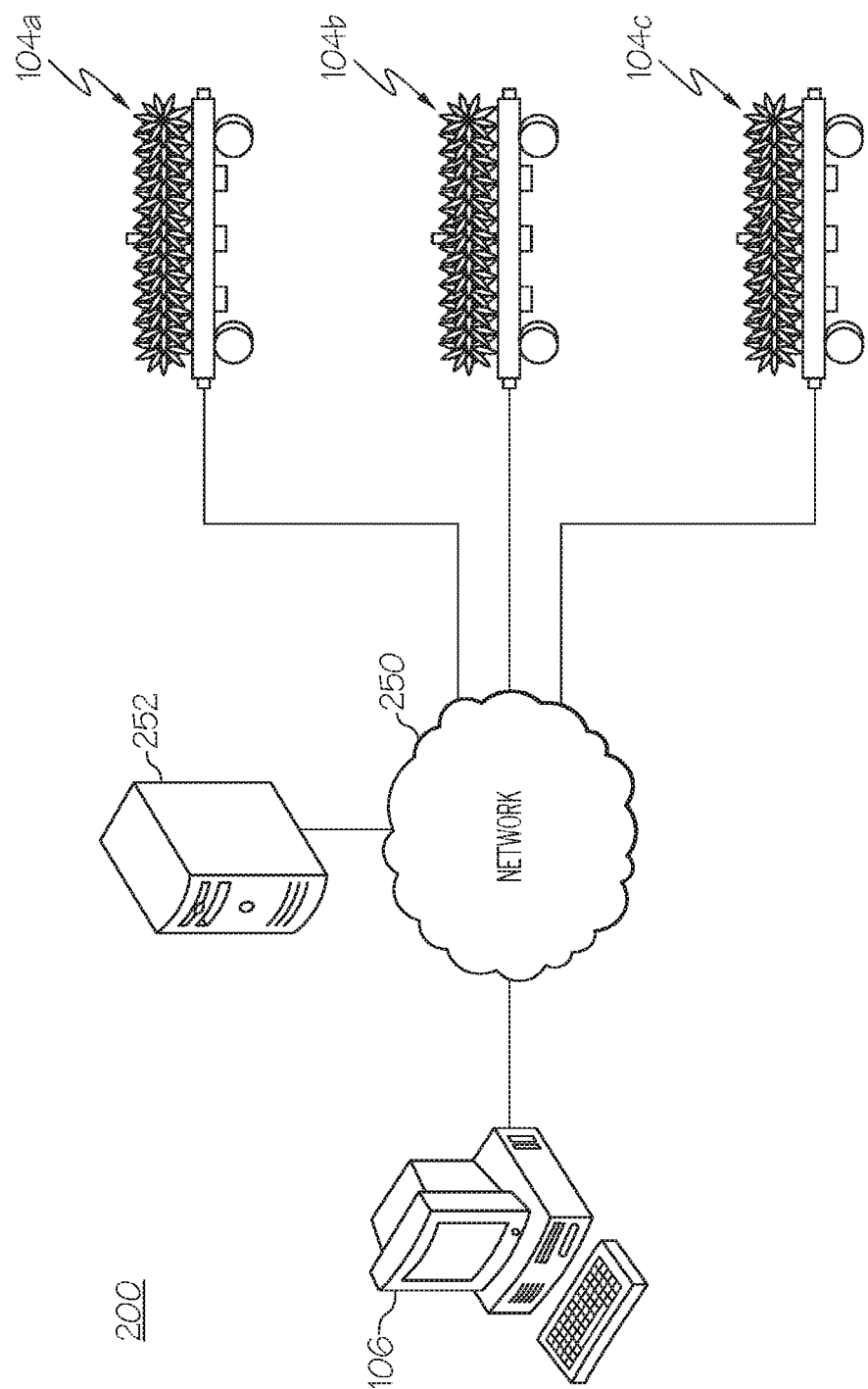
FIG. 2 depicts an illustrative network environment for various components in an assembly line grow pod according to embodiments described herein.

FIG. 2 depicts an illustrative network environment 200 for an industrial cart 104 in a grow house. As illustrated, each of a plurality of industrial carts 104 (e.g., a first industrial cart 104a, a second industrial cart 104b, and a third industrial cart 104c and collectively referred to herein as industrial cart(s) 104 or cart(s) 104) may be communicatively coupled to a network 250. Additionally, the network 250 may be communicatively coupled to the master controller 106 and/or a remote computing device 252. The master controller 106 may be configured to communicate with and control various components of the assembly line grow pod 100 including the plurality of industrial carts 104.

The master controller 106 may be a personal computer, laptop, mobile device, tablet, server, etc. and may be utilized as an interface to the assembly line grow pod 100 for a user. Depending on the embedment, the master controller 106 may be integrated as part of the assembly line grow pod 100 or may be merely coupled to the assembly line grow pod 100. For example, an industrial cart 104 may send a notification to a user through the master controller 106.

Similarly, the remote computing device 252 may include a server, personal computer, tablet, mobile device, etc. and may be utilized for machine-to-machine communications. As an example, if the industrial cart 104 (and/or assembly line grow pod 100 from FIG. 1) determines that a type of seed being used requires a specific configuration for the assembly line grow pod 100 to increase plant growth or output (e.g., through the cart-computing device 228 and/or one or more sensors e.g., 232, 234, 236), then the industrial cart 104 may communicate with the remote computing device 252 to retrieve the desired data and/or settings for the specific configuration.

The desired data may include a recipe for growing that type of seed and/or other information. The recipe may include time limits for exposure to light, amounts of water and the frequency of watering, environmental conditions such as temperature and humidity, and/or the like. The industrial cart 104 may further query the master controller 106 and/or remote computing device 252 for information such as ambient conditions, firmware updates, etc. Likewise, the master controller 106 and/or the remote computing device 252 may provide one or more instructions in a communication signal to the industrial cart 104 that includes control parameters for the drive motor 226. As such, some embodiments may utilize an application program interface (API) to facilitate this or other computer-to-computer communications.

The network 250 may include the internet or other wide area network, a local network, such as a local area network, a near field network, such as Bluetooth or a near field communication (NFC) network. In some embodiments, the network 250 is a personal area network that utilizes Bluetooth technology to communicatively couple the master controller 106, the remote computing device 252, one or more industrial carts 104, and/or any other network connectable device. In some embodiments, the network 250 may include one or more computer networks (e.g., a personal area network, a local area network, or a wide area network), cellular networks, satellite networks and/or a global positioning system and combinations thereof. Accordingly, at least the one or more industrial carts 104 may be communicatively coupled to the network 250 via the electrically conductive track 102, via wires, via a wide area network, via a local area network, via a personal area network, via a cellular network, via a satellite network, and/or the like. Suitable local area networks may include wired Ethernet and/or wireless technologies such as, for example, Wi-Fi. Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Communications between the various components of the network environment 200 may be facilitated by various components of the assembly line grow pod 100. For example, the track 102 may include one or more rails that support the industrial cart 104 and are communicatively coupled to the master controller 106 and/or remote computing device 252 through the network 250 as shown in FIGS. 1 and 2. In some embodiments, the track 102 includes at least two rails 111a and 111b. Each of the two rails 111a and 111b of the track 102 may be electrically conductive. Each rail 111 may be configured for transmitting communication signals and electrical power to and from the industrial cart 104 via the one or more wheels 222 rotatably coupled to the industrial cart 104 and supported by the track 102, as shown in more detail in FIG. 3. That is, a portion of the track 102 is electrically conductive and a portion of the one or more wheels 222 is in electrical contact with the portion of the track 102 that is electrically conductive.

Figure 3:
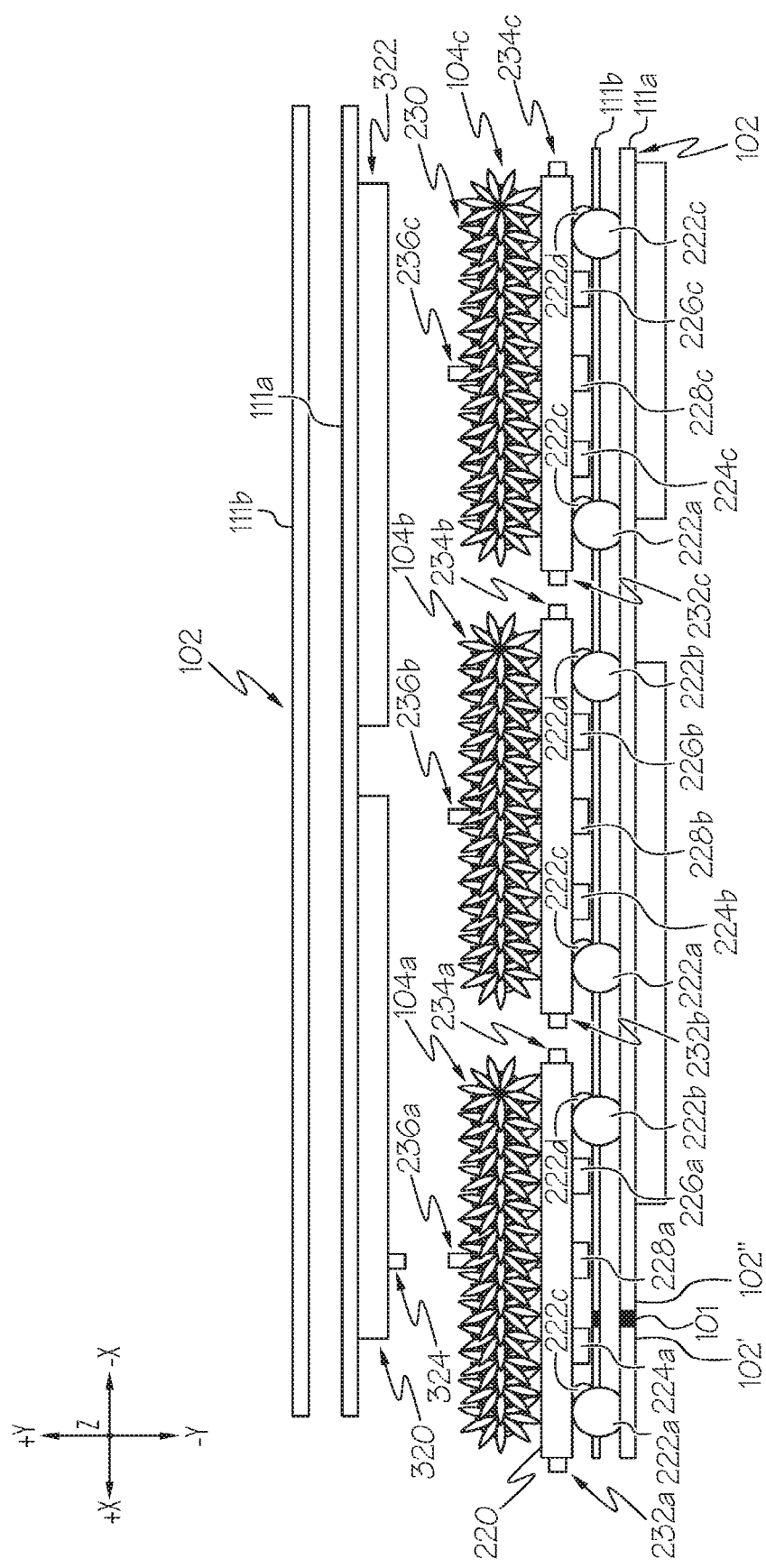
FIG. 3 depicts a plurality of illustrative industrial carts supporting a payload in an assembly line configuration according to embodiments described herein.

Referring to FIG. 3, a plurality of illustrative industrial carts 104 (e.g., the first industrial cart 104a, the second industrial cart 104b, and the third industrial cart 104c), each supporting a payload 230 in an assembly line configuration on the track 102 is depicted. In some embodiments, the track 102 may include one rail and one wheel 222 in electrical contact with the one rail. In such an embodiment, the one wheel 222 may relay communication signals and electrical power to the industrial cart 104 as the cart travels along the track 102.

In some embodiments, the track 102 may include two conductive rails (e.g. 111a and 111b). The conductive rails may be coupled to an electrical power source. The electrical power source may be a direct current source or an alternating current source. For example, each one of the two parallel rails 111a and 111b of the track 102 may be electrically coupled to one of the two poles (e.g., a negative pole and a positive pole) of the direct current source or the alternating current source. In some embodiments, one of the parallel rails (e.g., 111a) supports a first pair of wheels 222 (e.g., 222a and 222b) and the other one of the parallel rails (e.g., 111b) supports a second pair of wheels (e.g., 222c and 222d). As such, at least one wheel 222 from each pair of wheels (e.g., 222a and 222c or 222b and 222d) are in electrical contact with each of the parallel rails 111a and 111b so that the industrial cart 104 and the components therein may receive electrical power and communication signals transmitted over the track 102.

Turning to the portion of FIG. 3 that includes industrial cart 104a, the portion of the track 102 that supports the wheels 222 of industrial cart 104a is segmented into two portions of track 102. That is, track 102 is segmented into a first electrically conductive portion 102' and a second electrically conductive portion 102". In some embodiments, the track 102 may be segmented into more than one electrical circuit. The electrically conductive portion of the track 102 may be segmented by a non-conductive section 101 such that a first electrically conductive portion 102' of the track 102 is electrically isolated from a second electrically conductive portion 102" of the track 102. For example, wheels 222a and 222c of industrial cart 104a are supported and electrically coupled to the first electrically conductive portion 102' of the track 102 and wheels 222b and 222d of industrial cart 104a are supported and electrically coupled to the second electrically conductive portion 102". The configuration allows the industrial cart 104a to continuously receive electrical power since at least two wheels (e.g., 222a and 222c or 222b and 222d) remain electrically coupled to one of the two electrically conductive portions of the track 102 as industrial cart 104a traverses the track 102.

As the industrial cart 104a traverses the track 102 from the first electrically conductive portion 102' to the second electrically conductive portion 102", the cart-computing device 228 may select which of the pair of wheels (e.g., 222a and 222c or 222b and 222d) from which to receive electrical power and communication signals. In some embodiments, an electrical circuit may be implemented to automatically and continuously select and provide electrical power to the components of the industrial cart 104a as the industrial cart 104a traverses from the first electrically conductive portion 102' to the second electrically conductive portion 102" of the track 102.

Figure 5A:
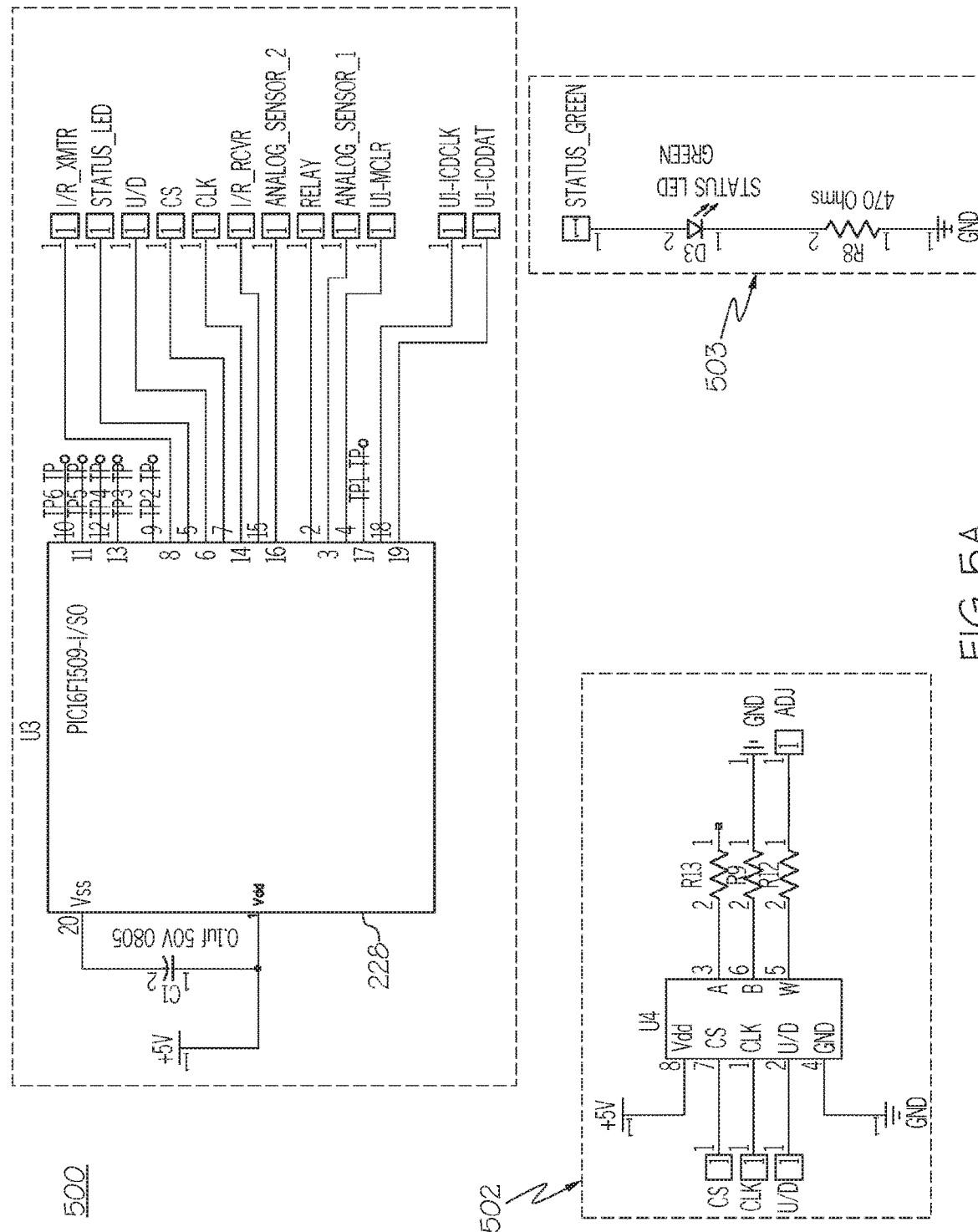
FIG. 5A depicts a circuit diagram of illustrative sub-circuits of electronics for a cart-computing device according to embodiments described herein.
Figure 5B:
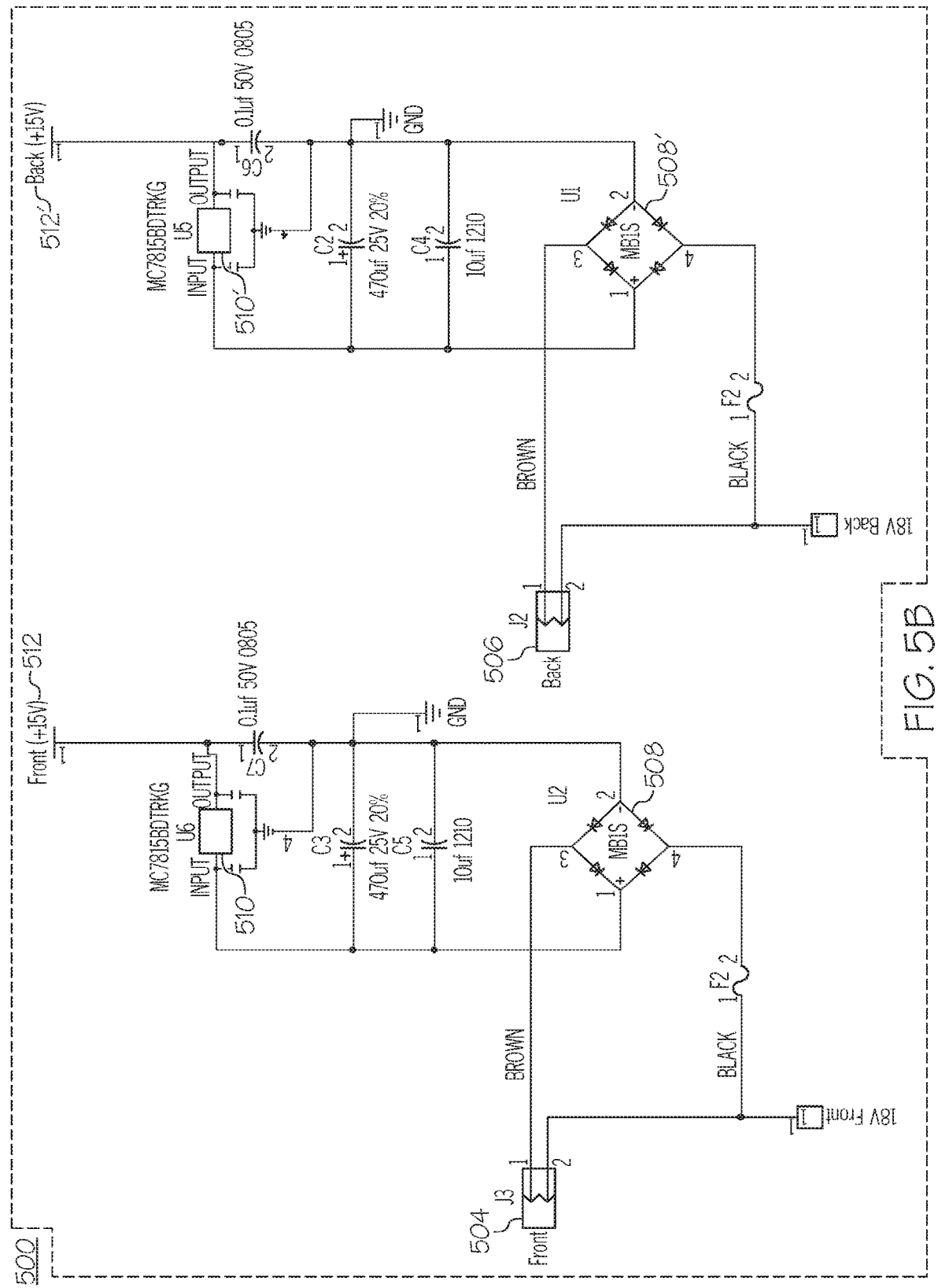
FIG. 5B depicts a circuit diagram of illustrative sub-circuits of electronics for a cart-computing device according to embodiments described herein.

An example of such an electrical circuit is depicted in FIG. 5B and further described with reference therein. In other words, the industrial cart 104a may be configured to select electrical power from either a first electrical power signal transmitted by the first electrically conductive portion 102' or a second electrical power signal transmitted by the second electrically conductive portion 102" when the industrial cart 104 spans and traverses the track 102 from the first electrically conductive portion 102' to the second conductive portion 102".

For example, when wheels 222a and 222c are in electrical contact with the first electrically conductive portion 102' and wheels 222b and 222d are in electrical contact with the second electrically conductive portion 102" the cart-computing device 228 or an electric circuit may select which of the two conductive portions 102' or 102" to draw electrical power. Furthermore, the cart-computing device 228 or the electric circuit may prevent the two conductive portions 102' or 102" from being shorted as the industrial cart 104a traverses both segments and may prevent the industrial cart 104a from being overloaded by two electrical power sources. Therefore, the cart-computing device 228 or other communicatively coupled electronic circuit (e.g., as depicted in FIG. 5B) may receive electrical power from one of the two conductive portions 102' or 102" through the one or more wheels 222 and then distribute the electrical power signals for use by the drive motor 226, the cart-computing device 228 and/or other electronic devices communicatively coupled to the industrial cart 104.

Still referring to FIG. 3, the communication signals and electrical power may include an encoded address specific to an industrial cart 104. Each industrial cart 104 may include a unique address such that multiple communications signals and electrical power signal may be transmitted over the same track 102 and each signal may be received by the intended recipient of that signal. For example, the assembly line grow pod 100 may implement a digital command control system (DCC). The DDC system may encode a digital packet having a command and an address of an intended recipient, for example, in the form of a pulse width modulated signal that is transmitted along with electrical power to the track 102.

In such a system, each industrial cart 104 may include a decoder, which may include a cart-computing device 228 coupled to the industrial cart 104, designated with a unique address. When the decoder receives a digital packet corresponding to its unique address, the decoder executes the embedded command. In some embodiments, the industrial cart 104 may also include an encoder, which may be included in the cart-computing device 228 coupled to the industrial cart 104, for generating and transmitting communications signals from the industrial cart 104. The encoder may enable the industrial cart 104 to communicate with other industrial carts 104 positioned along the track 102 and/or other systems or computing devices communicatively coupled with the track 102.

While the implementation of a DCC system is disclosed herein as an example of providing communication signals and/or electrical power to a designated recipient along a common interface (e.g., the track 102), any system and method capable of transmitting communication signals along with electrical power to and from a specified recipient may be implemented. For example, some embodiments may be configured to transmit data over AC circuits by utilizing a zero-crossing of the power from negative to positive (or vice versa).

In embodiments that include a system using alternating current to provide electrical power to the industrial carts 104, the communication signals may be transmitted to the industrial cart 104 during the zero-crossing of the alternating current sine wave. That is, the zero-crossing is the point at which there is no voltage present from the alternating current power source. As such, a communication signal may be transmitted during this interval. In some embodiments, the industrial cart 104 may only receive communication signals while traveling along portions of the track 102. Therefore, in such embodiments, during a first zero-crossing interval, a communication signal may be transmitted to and received by the cart-computing device 228 of the industrial cart 104. The communication signal transmitted during the first zero-crossing interval may include a command and a direction to execute the command when a subsequent command signal is received and/or at a particular time in the future. During a subsequent zero-crossing interval, a communication signal may include a synchronization pulse, which may indicate to the cart-computing device 228 of the industrial cart 104 to execute the previously received command. The aforementioned communication signal and command structure is only an example. As such, other communication signals and command structures or algorithms may be employed within the spirit and scope of the present disclosure.

In further embodiments that use alternating current to provide electrical power to the industrial carts 104, the communication signals may be transmitted to the industrial cart 104 during the zero-crossing of the alternating current sine wave. In some embodiments, a communication signal may be defined by the number of AC waveform cycles, which occur between a first trigger condition and a second trigger condition. In some embodiments, the first and second trigger condition, which may be the presence of a pulse (e.g., a 5 volt pulse) may be introduced in the power signal during the zero-crossing of the AC electrical power signal. In some embodiments, the first and second trigger condition may be or a change in the peak AC voltage of the AC electrical power signal. For example, the first trigger condition may be the change in peak voltage from 18 volts to 14 volts and the second trigger condition may be the change in peak voltage from 14 volts to 18 volts. The cart-computing device 228 may be electrically coupled to the wheels 222 and may be configured to sense changes in the electrical power signal transmitted over the track 102 and through the wheels 222. When the cart-computing device 228 detects a first trigger condition, the cart-computing device 228 may begin counting the number of peak AC voltage levels, the number of AC waveform cycles, or the amount of time until a second trigger condition is detected. In some embodiments, the count corresponds to a predefined operation or communication message. For example, a 5 count may correspond to an instruction for powering on the drive motor 226 and an 8 count may correspond to an instruction for powering off the driver motor. Each of the instructions may be predefined in the cart-computing devices 228 of the industrial carts 104 so that the cart-computing device 228 may translate the count into the corresponding instruction and/or control signal. The aforementioned communication signals and command structures are only examples. As such, other communication signals and command structures or algorithms may be employed within the spirit and scope of the present disclosure.

In some embodiments, bi-directional communication may occur between the cart-computing device 228 of the industrial cart 104 and the master controller 106. In some embodiments, the industrial cart 104 may generate and transmit a communication signal through the wheel 222 and the track 102 to the master controller 106. In some embodiments, transceivers may be positioned anywhere on the track 102. The transceivers may communicate via IR or other near-field communication system with one or more industrial carts 104 positioned along track 102. The transceivers may be communicatively coupled with the master controller 106 or another computing device, which may receive a transmission of a communication signal from the industrial cart 104.

In some embodiments, the cart-computing device 228 may communicate with the master controller 106 using a leading sensor 232a-232c, a trailing sensor 234a-234c, and/or an orthogonal sensor 236a-236c included on the industrial cart 104. Collectively, the leading sensors 232a-232c, trailing sensors 234a-234c, and orthogonal sensors 236a-236c are referred to as leading sensors 232, trailing sensors 234, and orthogonal sensors 236, respectively. The sensors 232, 234, 236 may be configured as a transceiver or include a corresponding transmitter module, In some embodiments, the cart-computing device 228 may transmit operating information, status information, sensor data, and/or other analytical information about the industrial cart 104 and/or the payload 230 (e.g., plants growing therein). In some embodiments, the master controller 106 may communicate with the cart-computing device 228 to update firmware and/or software stored on the industrial cart 104.

Since the industrial carts 104 are limited to travel along the track 102, the area of track 102 an industrial cart 104 will travel in the future is referred to herein as "in front of the industrial cart" or "leading." Similarly, the area of track 102 an industrial cart 104 has previously traveled is referred to herein as "behind the industrial cart" or "trailing." Furthermore, as used herein, "above" refers to the area extending from the industrial cart 104 away from the track 102 (i.e., in the +Y direction of the coordinate axes of FIG. 3). "Below" refers to the area extending from the industrial cart 104 toward the track 102 (i.e., in the −Y direction of the coordinate axes of FIG. 3).

Still referring to FIG. 3, one or more components may be coupled to the tray 220. For example, each industrial cart 104a-104c may include a back-up power supply 224a-224c, a drive motor 226a-226c, a cart-computing device 228a-228c, a tray 220 and/or the payload 230. Collectively, the back-up power supplies 224a-224c, drive motors 226a-226c, and cart-computing devices 228a-228c are referred to as back-up power supply 224, drive motor 226, and cart-computing device 228. The tray 220 may additionally support a payload 230 thereon. Depending on the particular embodiment, the payload 230 may contain plants, seedlings, seeds, etc. However, this is not a requirement as any payload 230 may be carried on the tray 220 of the industrial cart 104.

The back-up power supply 224 may comprise a battery, storage capacitor, fuel cell or other source of reserve electrical power. The back-up power supply 224 may be activated in the event the electrical power to the industrial cart 104 via the wheels 222 and track 102 is lost. The back-up power supply 224 may be utilized to power the drive motor 226 and/or other electronics of the industrial cart 104. For example, the back-up power supply 224 may provide electrical power to the cart-computing device 228 or one or more sensors 232, 234, and 236. The back-up power supply 224 may be recharged or maintained while the cart is connected to the track 102 and receiving electrical power from the track 102.

The drive motor 226 is coupled to the industrial cart 104. In some embodiments, the drive motor 226 may be coupled to at least one of the one or more wheels 222 such that the industrial cart 104 is capable of being propelled along the track 102 in response to a received signal. In other embodiments, the drive motor 226 may be coupled to the track 102. For example, the drive motor 226 may be rotatably coupled to the track 102 through one or more gears, which engage a plurality of teeth, arranged along the track 102 such that the industrial cart 104 is propelled along the track 102. That is, the gears and the track 102 may act as a rack and pinion system that is driven by the drive motor 226 to propel the industrial cart 104 along the track 102.

The drive motor 226 may be configured as an electric motor and/or any device capable of propelling the industrial cart 104 along the track 102. For example, the drive motor 226 may be a stepper motor, an alternating current (AC) or direct current (DC) brushless motor, a DC brushed motor, or the like. In some embodiments, the drive motor 226 may comprise electronic circuitry, which may be used to adjust the operation of the drive motor 226, in response to a communication signal (e.g., a command or control signal for controlling the operation of the industrial cart 104) transmitted to and received by the drive motor 226. The drive motor 226 may be coupled to the tray 220 of the industrial cart 104 or may be directly coupled to the industrial cart 104. In some embodiments, more than one drive motor 226 may be included on the industrial cart 104. For example, each wheel 222 may be rotatably coupled to a drive motor 226 such that the drive motor 226 drives rotational movement of the wheels 222. In other embodiments, the drive motor 226 may be coupled through gears and/or belts to an axle, which is rotatably coupled to one or more wheels 222 such that the drive motor 226 drives rotational movement of the axle that rotates the one or more wheels 222.

In some embodiments, the drive motor 226 is electrically coupled to the cart-computing device 228. The cart-computing device 228 may electrically monitor and control the speed, direction, torque, shaft rotation angle, or the like, either directly and/or via a sensor that monitors operation of the drive motor 226. In some embodiments, the cart-computing device 228 may electrically control the operation of the drive motor 226. In some embodiments, the cart-computing device 228 may receive a communication signal transmitted through the electrically coupled track 102 and the one or more wheels 222 from the master controller 106 or other computing device communicatively coupled to the track 102. In some embodiments, the cart-computing device 228 may directly control the drive motor 226 in response to signals received through a network interface hardware 414 (as depicted and described with reference to FIG. 4). In some embodiments, the cart-computing device 228 executes power logic 436 (as depicted and described with reference to FIG. 4) to control the operation of the drive motor 226.

Still referring to FIG. 3, the cart-computing device 228 may control the drive motor 226 in response to one or more signals received from a leading sensor 232, a trailing sensor 234, and/or an orthogonal sensor 236 included on the industrial cart 104 in some embodiments. Each of the leading sensor 232, the trailing sensor 234, and the orthogonal sensor 236 may comprise an infrared sensor, a photo-eye sensor, a visual light sensor, an ultrasonic sensor, a pressure sensor, a proximity sensor, a motion sensor, a contact sensor, an image sensor, an inductive sensor (e.g., a magnetometer)

or other type of sensor capable of detecting at least the presence of an object (e.g., another industrial cart 104 or a location marker 324) and generating one or more signals indicative of the detected event (e.g., the presence of the object).

As used herein, a "detected event" refers to an event for which a sensor is configured to detect. In response, the sensor may generate one or more signals corresponding to the event. For example, if the sensor is configured to generate one or more signals in response to the detection of an object, the detected event may be the detection of an object. Moreover, the sensor may be configured to generate one or more signals that correspond to a distance from the sensor to an object as a distance value, which may also constitute a detected event. As another example, a detected event may be a detection of infrared light. In some embodiments, the infrared light may be generated by the infrared sensor reflected off an object in the field of view of the infrared sensor and received by the infrared sensor.

In some embodiments, an infrared emitter may be coupled with the industrial cart 104 or in the environment of the assembly line grow pod 100, and may generate infrared light which may be reflected off an object and detected by the infrared sensor. In some instances, the infrared sensor may be calibrated to generate a signal when the detected infrared light is above a defined threshold value (e.g., above a defined power level). In some embodiments, a pattern (e.g. a barcode or QR code) may be represented in the reflected infrared light, which may be received by the infrared sensor and used to generate one or more signals indicative of the pattern detected by the infrared sensor. The aforementioned is not limited to infrared light. Various wavelengths of light, including visual light, such as red or blue, may also be emitted, reflected, and detected by a visual light sensor or an image sensor that generates one or more signals in response to the light detection. As an additional example, a detected event may be a detection of contact with an object (e.g., as another industrial cart 104) by a pressure sensor or contact sensor, which generates one or more signals corresponding thereto.

In some embodiments, the leading sensor 232, the trailing sensor 234, and the orthogonal sensor 236 may be communicatively coupled to the cart-computing device 228. The cart-computing device 228 may receive the one or more signals from one or more of the leading sensor 232, the trailing sensor 234, and the orthogonal sensor 236. In response to receiving the one or more signals, the cart-computing device 228 may execute a function defined in an operating logic 432, communication logic 434 and/or power logic 436, which are described in more detail herein with reference to at least FIG. 4. For example, in response to the one or more signals received by the cart-computing device 228, the cart-computing device 228 may adjust, either directly or through intermediate circuitry, a speed, a direction, a torque, a shaft rotation angle, and/or the like of the drive motor 226.

In some embodiments, the leading sensor 232, the trailing sensor 234, and/or the orthogonal sensor 236 may be communicatively coupled to the master controller 106 (FIG. 1). In some embodiments, the leading sensor 232, the trailing sensor 234, and the orthogonal sensor 236 may generate one or more signals that may be transmitted via the one or more wheels 222 and the track 102 (FIG. 1). In some embodiments, the track 102 and/or the industrial cart 104 may be communicatively coupled to a network 250 (FIG. 2). Therefore, the one or more signals may be transmitted to the master controller 106 via the network 250 over the network interface hardware 414 (FIG. 4) or the track 102 and in response, the master controller 106 may return a control signal to the industrial cart 104 for controlling the operation of one or more drive motors 226 of one or more industrial carts 104 positioned on the track 102.

Still referring to FIG. 3, the one or more signals from one or more of the leading sensor 232, the trailing sensor 234, and the orthogonal sensor 236 may directly adjust and control the drive motor 226 in some embodiments. For example, electrical power to the drive motor 226 may be electrically coupled with a field-effect transistor, relay, or other similar electronic device capable of receiving one or more signals from a sensor. For example, electrical power to the drive motor 226 may be electrically coupled via a contact sensor that selectively activates or deactivates the operation of the drive motor 226 in response to the one or more signals from the sensor.

That is, if a contact sensor electromechanically closes (i.e., the contact sensor contacts an object, such as another industrial cart 104), then the electrical power to the drive motor 226 is terminated. Similarly, when the contact sensor electromechanically opens (i.e., the contact sensor is no longer in contact the object), then the electrical power to the drive motor 226 may be restored. This may be accomplished by including the contact sensor in series with the electrical power to the drive motor 226 or through an arrangement with one or more electrical components electrically coupled to the drive motor 226. In other embodiments, the operation of the drive motor 226 may adjust proportionally to the one or more signals from the one or more sensors 232, 234, and 236. For example, an ultrasonic sensor may generate one or more signals indicating the range of an object from the sensor and as the range increases or decreases, the electrical power to the drive motor 226 may increase or decrease, thereby increasing or decreasing the output of the drive motor 226 accordingly.

The leading sensor 232 may be coupled to the industrial cart 104 such that the leading sensor 232 detects adjacent objects, such as another industrial cart 104 in front of or leading the industrial cart 104. In addition, the leading sensor 232 may be coupled to the industrial cart 104 such that the leading sensor 232 communicates with other sensors 232, 234, and 236 coupled to another industrial cart 104 that are in front of or leading the industrial cart 104. The trailing sensor 234 may be coupled to the industrial cart 104 such that the trailing sensor 234 detects adjacent objects, such as another industrial cart 104 behind or trailing the industrial cart 104. In addition, the trailing sensor 234 may be coupled to the industrial cart 104 such that the trailing sensor 234 communicates with other sensors 232, 234, and 236 coupled to another industrial cart 104 that are behind or trailing the industrial cart 104.

The orthogonal sensor 236 may be coupled to the industrial cart 104 to detect or communicate with adjacent objects, such as location markers 324, positioned above, below, and/or beside the industrial cart 104. While FIG. 3 depicts the orthogonal sensor 236 positioned generally above the industrial cart 104, as previously stated, the orthogonal sensor 236 may be coupled with the industrial cart 104 in any location which allows the orthogonal sensor 236 to detect and/or communicate with objects, such as a location marker 324, above and/or below the industrial cart 104.

In some embodiments, the location markers 324 may be arranged along the track 102 or the supporting structures to the track 102 at pre-defined intervals. The orthogonal sensor 236 may include for example, a photo-eye type sensor. In addition, the orthogonal sensor 236 may be coupled to the industrial cart 104 such that the photo-eye type sensor images the location markers 324 positioned along the track 102 below the industrial cart 104. As such, the cart-computing device 228 and/or master controller 106 may receive one or more signals generated from the photo-eye when the photo-eye detects a location marker 324 as the industrial cart 104 travels along the track 102.

The cart-computing device 228 and/or master controller 106, from the one or more signals, may determine the speed of the industrial cart 104. Additionally, the speed of each of the other industrial carts 104 traveling on the track 102 may also be determined. In some embodiments, in response to determining the speed of one or more of the industrial carts 104 on the track 102, the cart-computing device 228 and/or master controller 106 may generate a control signal or communication signal (e.g., through the track 102 and the wheel 222 of the industrial cart 104) to the drive motor 226 of the industrial cart 104 to adjust the speed of the drive motor 226. In some embodiments, control of the drive motor 226 may be utilized to maintain a uniform speed between the one or more industrial carts 104a-104c on the track 102 and/or adjust the distance between one or more of the industrial carts 104a-104c on the track 102.

Still referring to FIG. 3, it should be understood that the leading sensors 232, the trailing sensors 234, and the orthogonal sensors 236 may each comprise one or more of the sensors 232, 234, and 236 described herein or one or more other sensors 232, 234, and 236 capable of detecting at least the presence of an object (e.g., another industrial cart 104 or a location marker 324, a detected event, etc.) and generating one or more signals indicative of the detected event. It should also be understood that the leading sensors 232, the trailing sensors 234, and the orthogonal sensors 236 may include a transmitter and/or transceiver module, such as an infrared emitter or other electromagnetic emitter. In some embodiments, the leading sensor 232b (e.g., of middle cart 104b) may be configured to communicate data with a trailing sensor 234a of a leading cart 104a. As such, the leading sensor 232b may include a communications port, as well as sensors (e.g., 232, 234, and 236) to determine a location and/or a relative location of the industrial cart 104 with respect to other carts in the assembly line. The trailing sensor 234b may be configured similar to the leading sensor 232b, except that the trailing sensor 234b is configured to communicate with a trailing cart 104c. Additionally, the orthogonal sensors 236 may include an infrared (IR) device and/or other device for facilitating communication with the master controller 106 (FIG. 1).

Still referring to FIG. 3, it should be understood that the leading sensors 232 and the trailing sensors 234 are depicted on a leading side and a trailing side of each of the industrial carts 104, respectively. However, this is merely an example. Depending on the types of devices utilized, the leading sensors 232 may be located anywhere on the industrial carts 104. Similarly, depending on the types of devices utilized for the trailing sensor 234, these devices may be positioned anywhere on the industrial carts 104. While some devices require line of sight, this is not a requirement.

In addition, the orthogonal sensors 236 are depicted in FIG. 3 as being directed substantially upward. This is also merely an example, as the orthogonal sensors 236 may be directed in any appropriate direction to communicate with the master controller 106. In some embodiments, the orthogonal sensors 236 may be directed below the industrial cart 104, to the side of the industrial carts 104, and/or may not require line of sight and may be placed anywhere on the industrial carts 104 (e.g., in embodiments where the orthogonal sensors 236 utilize a radio frequency device, a near-field communication device, or the like).

In some embodiments, the orthogonal sensors 236 may comprise a transmitting component where data may be transmitted to and received by the location marker 324. For example, the orthogonal sensors 236 may comprise a near-field communication module and/or an RFID module, which is correspondingly, registered by the location marker 324 to indicate a unique identification of the industrial cart 104a, which is adjacent the location marker 324. However, it should be understood that generally the orthogonal sensors 236 and the location marker 324 operate to identify a location of the industrial carts 104 along the track 102.

As previously referenced, three industrial carts 104a-104c are depicted in FIG. 3 as a leading cart 104a, a middle cart 104b, and a trailing cart 104c supported on the track 102. As the industrial carts 104a, 104b, and 104c move along the track 102 (e.g. in the +X direction of the coordinate axes of FIG. 3), the leading sensor 232b and the trailing sensor 234b of the middle cart 104b may detect the trailing cart 104c and the leading cart 104a, respectively. That is, detection of the adjacent carts allows the middle cart 104b to maintain a distance from the trailing cart 104c and the leading cart 104a. For example, the leading sensor 232b of the middle cart 104b may detect the distance between the middle cart 104b and the leading cart 104a (e.g., a detected event) and generate one or more signals indicative of the distance. In some embodiments, if the distance between the middle cart 104b and the leading cart 104a is above a predetermined value or threshold value, then the speed of the drive motor 226b of middle cart 104b may be increased to decrease the distance between the middle cart 104b and the leading cart 104a. For example, if the predetermined value is about 12 inches and the distance, as determined by the leading sensor 232b, is about 18 inches, then the speed of the drive motor 226b of industrial cart 104b may be increased until the distance is about 12 inches or less.

In some embodiments, a distance between the leading cart 104a and the middle cart 104b may be defined as a range. For example, a range may be defined as a distance from about 8 inches to about 12 inches. If the distance is outside the range, then the speed of the drive motor 226b of the middle cart 104b may be increased or decreased to reduce or increase the distance between the middle cart 104b and the leading cart 104a, respectively. For example, if the distance between the industrial cart 104b and the leading cart 104a is about 18 inches, as determined by the leading sensor 232b, then the speed of the drive motor 226b of the middle cart 104b is increased until the distance is less than 12 inches but greater than 8 inches. Similarly, if the distance between the middle cart 104b and the leading cart 104a is either outside the range or less than a predetermined value or threshold, then the drive motor 226b of the middle cart 104b may be adjusted. For example, the speed of the drive motor 226b may be decreased such that the distance between the middle cart 104b and the leading cart 104a returns to a value within the defined range or is equal to or greater than the predetermined value.

In some embodiments, the same adjustments may also be applied to the distance between the middle cart 104b and a trailing cart 104c. In such embodiments, the trailing sensor 234b of middle cart 104b may determine the distance between the middle cart 104b and the trailing cart 104c. In response to the one or more signals indicative of the distance between the middle cart 104b and the trailing cart 104c, the drive motor 226b of the middle cart 104b may be adjusted. For example, the drive motor 226b may be increased in speed if the distance is above a predetermined value or above a maximum value in the range. Similarly, the drive motor 226b may be decreased in speed if the distance is below a predetermined value or below a minimum value in the range. In some embodiments, decreasing the speed of the drive motor 226 may include stopping the rotational motion of the drive motor 226, effectively stopping the cart from being propelled.

It should also be understood that the industrial carts 104 may, in some embodiments, utilize the one or more signals from each of their respective leading sensors 232 and/or trailing sensors 234 to determine which drive motor 226 of industrial carts 104 should be adjusted to reduce or increase the distance between each of the industrial carts 104. For example, if the distance between the leading cart 104a and the middle cart 104b is less than the predetermined value and the distance between the middle cart 104b and the trailing cart 104c is less than the predetermined value, then the drive motor 226a of the leading cart 104a and the drive motor 226b of the middle cart 104b may be increased to adjust the distances between each of the industrial carts 104. In such embodiments, the industrial carts 104 may communicate their determined distances, (e.g., as determined by their respective leading sensors 232 and trailing sensors 234) to determine which of the drive motors 226 needs to be adjusted.

As discussed herein, the one or more signals generated by the leading sensors 232 and trailing sensors 234 may be analyzed by the master controller 106 (FIG. 1) or the one or more cart-computing devices 228. The one or more signals may be transmitted through the track 102 and the one or more wheels 222 to the master controller 106 (FIG. 1) and/or one or more of the cart-computing devices 228 of industrial carts 104. In some embodiments, the one or more signals may be transmitted between industrial carts 104 by transmitting and receiving data with the leading sensors 232 and trailing sensors 234.

In some instances, the drive motor 226b of the middle cart 104b may malfunction. In such a case, the middle cart 104b may utilize the trailing sensor 234b to communicate with the trailing cart 104c that the drive motor 226b of the middle cart 104b has malfunctioned. In response, the trailing cart 104c may push the middle cart 104b. To accommodate the extra load in pushing the middle cart 104b, the trailing cart 104c may adjust its operation mode (e.g., increase the electrical power to the drive motor 226c of the trailing cart 104c). The trailing cart 104c may push the middle cart 104b until the malfunction has been repaired. In some embodiments, the middle cart 104b may comprise a slip clutch and gear arrangement coupled to the drive motor 226b and the track 102. As such, when the trailing cart 104c begins pushing the middle cart 104b the slip clutch and gear arrangement may disengage from the track 102 such that the middle cart 104b may be propelled along the track 102. This allows the middle cart 104b to be freely pushed by the trailing cart 104c. The slip clutch may reengage with the track 102 once the malfunction is corrected and the trailing cart 104c stops pushing.

As will be understood, the leading sensor 232a of the leading cart 104a and the trailing sensor 234c of the trailing cart 104c may be configured to communicate with other industrial carts 104 that are not depicted in FIG. 3. Similarly, some embodiments may cause the leading sensor 232b to communicate with the trailing sensor 234a of the leading cart 104a to pull the middle cart 104b in the event of a malfunction. Additionally, some embodiments may cause the industrial carts 104 to communicate status and other information, as desired or necessary.

Still referring to FIG. 3, a location marker 324 is coupled to the track 102. Although the location marker 324 is depicted as being coupled to the underside of the track 102 above the industrial carts 104, the location marker 324 may be positioned in any location capable of indicating a unique section of the track 102 to the industrial carts 104. The location marker 324 may be include a communication portal and may be configured to communicate with the any of the orthogonal sensors 236. The location marker 324 may comprise an infrared emitter, a bar code, a QR code or other marker capable of indicating a unique location. That is, the location marker 324 may be an active device or a passive device for indicating a location along the track 102. In some embodiments, the location marker 324 may emit infrared light or visual light at a unique frequency that may be identifiable by the orthogonal sensors 236. In some embodiments, the location marker 324 may require line of sight and thus will communicate with the one or more industrial carts 104 that are within that range. Regardless, the respective industrial cart 104 may communicate data detected from cart sensors, including the leading sensors 232, the trailing sensors 234, and/or other sensors. Additionally, the master controller 106 may provide data and/or commands for use by the industrial carts 104 via the location marker 324.

In operation, the location marker 324 may correspond to a particular location along the track 102. That is, the location marker 324 may communicate a unique identifier corresponding to a particular location. For example, as the middle cart 104b passes in proximity to the location marker 324, the orthogonal sensor 236b may register (i.e., detect the location marker 324) the particular location. The particular location represented by the location marker 324 may be used to determine the position of the middle cart 104b with respect to the leading cart 104a and/or the trailing cart 104c. Additionally, other functional attributes of the middle cart 104b may also be determined. For example, the speed of the middle cart 104b may be determined based on the time that elapses between two separate location markers where each location marker corresponds to separate location along the track 102 and the distance between the two location markers is known. Additionally, through communication with the master controller 106 (FIG. 1) or with the other industrial carts 104, distances between the industrial carts 104 may be determined. In response, the drive motors 226 may be adjusted, if necessary.

Figure 4:
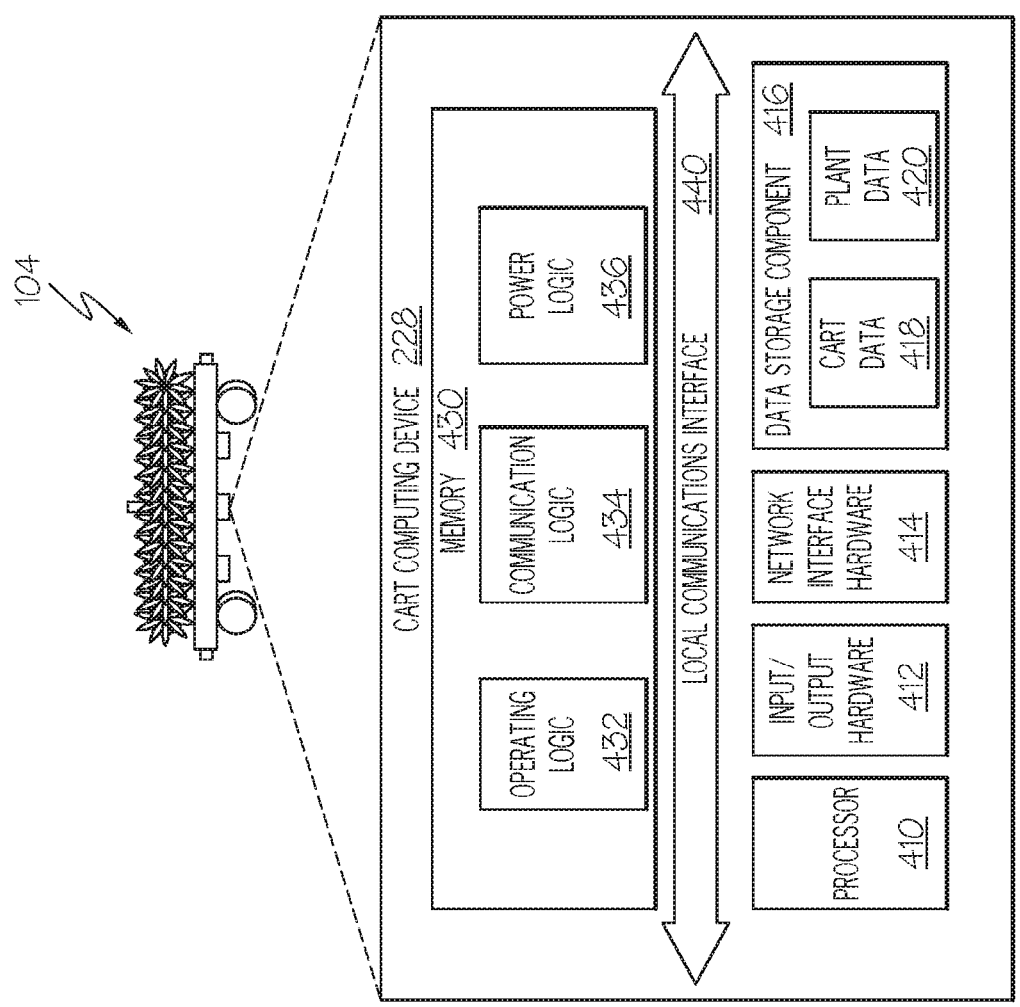
FIG. 4 depicts various components of an illustrative cart-computing device for facilitating communication according to embodiments described herein.

FIG. 4 depicts an illustrative cart-computing device 228 for facilitating communication. As illustrated, the cart-computing device 228 includes a processor 410, input/output hardware 412, the network interface hardware 414, a data storage component 416 (which stores systems data 418, plant data 420, and/or other data), and the memory component 430. The memory component 430 may store operating logic 432, the communications logic 434, and the power logic 436. The communications logic 434 and the power logic 436 may each include a plurality of different pieces of logic, each of which may be embodied as a computer program, firmware, and/or hardware, as an example. A local communications interface 440 is also included in FIG. 4 and may be implemented as a bus or other communication interface to facilitate communication among the components of the cart-computing device 228.

The processor 410 may include any processing component operable to receive and execute instructions (such as from a data storage component 416 and/or the memory component 430). The processor 410 may be any device capable of executing the machine-readable instruction set stored in the memory component 430. Accordingly, the processor 410 may be an electric controller, an integrated circuit, a microchip, a computer, or any other computing device. The processor 410 is communicatively coupled to the other components of the assembly line grow pod 100 by a communication path and/or the local communications interface 440. Accordingly, the communication path and/or the local communications interface 440 may communicatively couple any number of processors 410 with one another, and allow the components coupled to the communication path and/or the local communications interface 440 to operate in a distributed computing environment. Specifically, each of the components may operate as a node that may send and/or receive data. While the embodiment depicted in FIG. 4 includes a single processor 410, other embodiments may include more than one processor 410.

The input/output hardware 412 may include and/or be configured to interface with microphones, speakers, a keyboard, a display, and/or other hardware. For example, the display may provide text and/or graphics indicating the status of each industrial cart 104 in the assembly line grow pod 100.

The network interface hardware 414 is coupled to the local communications interface 440 and communicatively coupled to the processor 410, the memory component 430, the input/output hardware 412, and/or the data storage component 416. The network interface hardware 414 may be any device capable of transmitting and/or receiving data via a network 250 (FIG. 2). Accordingly, the network interface hardware 414 can include a communication transceiver for sending and/or receiving any wired or wireless communication. For example, the network interface hardware 414 may include and/or be configured for communicating with any wired or wireless networking hardware, including an antenna, a modem, LAN port, Wi-Fi card, WiMax card, ZigBee card, Bluetooth chip, USB card, mobile communications hardware, near-field communication hardware, satellite communication hardware and/or any wired or wireless hardware for communicating with other networks and/or devices.

In one embodiment, the network interface hardware 414 includes hardware configured to operate in accordance with the Bluetooth wireless communication protocol. In another embodiment, the network interface hardware 414 may include a Bluetooth send/receive module for sending and receiving Bluetooth communications to/from the network 250 (FIG. 2). The network interface hardware 414 may also include a radio frequency identification ("RFID") reader configured to interrogate and read RFID tags. From this connection, communication may be facilitated between the cart-computing devices 228 of the industrial carts 104, the master controller 106 and/or the remote computing device 252 depicted in FIG. 2.

The memory component 430 may be configured as volatile and/or nonvolatile memory and may comprise RAM (e.g., including SRAM, DRAM, and/or other types of RAM), ROM, flash memories, hard drives, secure digital (SD) memory, registers, compact discs (CD), digital versatile discs (DVD), or any non-transitory memory device capable of storing machine-readable instructions such that the machine-readable instructions can be accessed and executed by the processor 410. Depending on the particular embodiment, these non-transitory computer-readable mediums may reside within the cart computing device 228 and/or external to the cart-computing device 228. The machine-readable instruction set may comprise logic or algorithm(s) written in any programming language of any generation (e.g., 1GL, 2GL, 3GL, 4GL, or 5GL) such as, for example, machine language that may be directly executed by the processor 410, or assembly language, object-oriented programming (OOP), scripting languages, microcode, etc., that may be compiled or assembled into machine readable instructions and stored in the non-transitory computer readable memory, e.g., the memory component 430. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 4 includes a single non-transitory computer readable memory, e.g. memory component 430, other embodiments may include more than one memory module.

Still referring to FIG. 4, the operating logic 432 may include an operating system and/or other software for managing components of the cart-computing device 228. As also discussed above, the communications logic 434 and the power logic 436 may reside in the memory component 430 and may be configured to perform the functionality, as described herein.

It should be understood that while the components in FIG. 4 are illustrated as residing within the cart-computing device 228, this is merely an example. In some embodiments, one or more of the components may reside on the industrial cart 104 external to the cart-computing device 228. It should also be understood that, while the cart-computing device 228 is illustrated as a single device, this is also merely an example. In some embodiments, the communications logic 434 and the power logic 436 may reside on different computing devices. As an example, one or more of the functionalities and/or components described herein may be provided by the master controller 106 and/or the remote computing device 252.

Additionally, while the cart-computing device 228 is illustrated with the communications logic 434 and the power logic 436 as separate logical components, this is also an example. In some embodiments, a single piece of logic (and/or or several linked modules) may cause the cart-computing device 228 to provide the described functionality.

Referring now to FIGS. 5A-5E, a circuit diagram 500 is depicted. The circuit diagram 500 is an example circuit for implementing the electronics of the industrial cart 104 (FIG. 1). As depicted in FIG. 5A, the electronics of the industrial cart 104 may be controlled through a cart-computing device 228, for example, the cart-computing device 228 may be a microcontroller also referred to as a peripheral interface controller ("PIC") 228. A PIC microcontroller 228 may include ROM, flash memory, or other forms of non-transitory computer readable memory for storing machine readable instruction sets such as operating logic 432, communication logic 434, and power logic 436. The memory component 430 may also store data such as cart data or plant data 420. The PIC microcontroller 228 may also include processing capabilities and more than one input and output interface for communicatively coupling with input/output hardware 412, network interface hardware 414, one or more sensors (e.g., 232, 234, and 236) or other components associated with the industrial cart 104. Furthermore, some PIC microcontrollers 228 include an internal clock and some utilize an external clock signal as an input. As depicted, the PIC microcontroller 228 receives a clock signal input from an external clock-generating component depicted in sub-circuit 502. Generally, a clock signal is produced by a clock generator and is used by the PIC microcontroller 228 to synchronize different components of a circuit and the execution of instructions at specified intervals and rates (i.e., frequencies). Additionally, the PIC microcontroller 228 couples through one of the input and output interfaces to a status sub-circuit 503. The status sub-circuit 503 includes a status LED that may be used to indicate a status, such as power or operating state of the PIC microcontroller 228.

As discussed in detail above, the industrial cart 104 receives electrical power and communication signals via the wheels 222, which are in contact with the track 102 as described herein. The circuit diagram 500 is continued in FIG. 5B, which depicts a sub-circuit where the pair of front wheels (for example, a pair of wheels 222a and 222c, FIG. 3 electrically coupled to opposite rails of the track 102), is electrically connected to the circuit at junction 504. Similarly, the pair of back wheels (e.g., 222b and 222d, FIG. 3) is electrically connected to the circuit at junction 506. Each wheel 222 in the pair of front wheels (e.g., 222a and 222c, FIG. 3) connects, for example, through wires, to a diode bridge 508 and subsequently to a voltage regulator 510. As such, the sub-circuit converts the AC power signal to a DC power signal and regulating the DC power signal to an output voltage 512 at to a predefined level, for example, 15 volts. Similarly, the pair of back wheels (e.g., 222b and 222d, FIG. 3) is connected to a diode bridge 508' and subsequently to a voltage regulator 510' to generate an output voltage 512'.

Figure 5C:
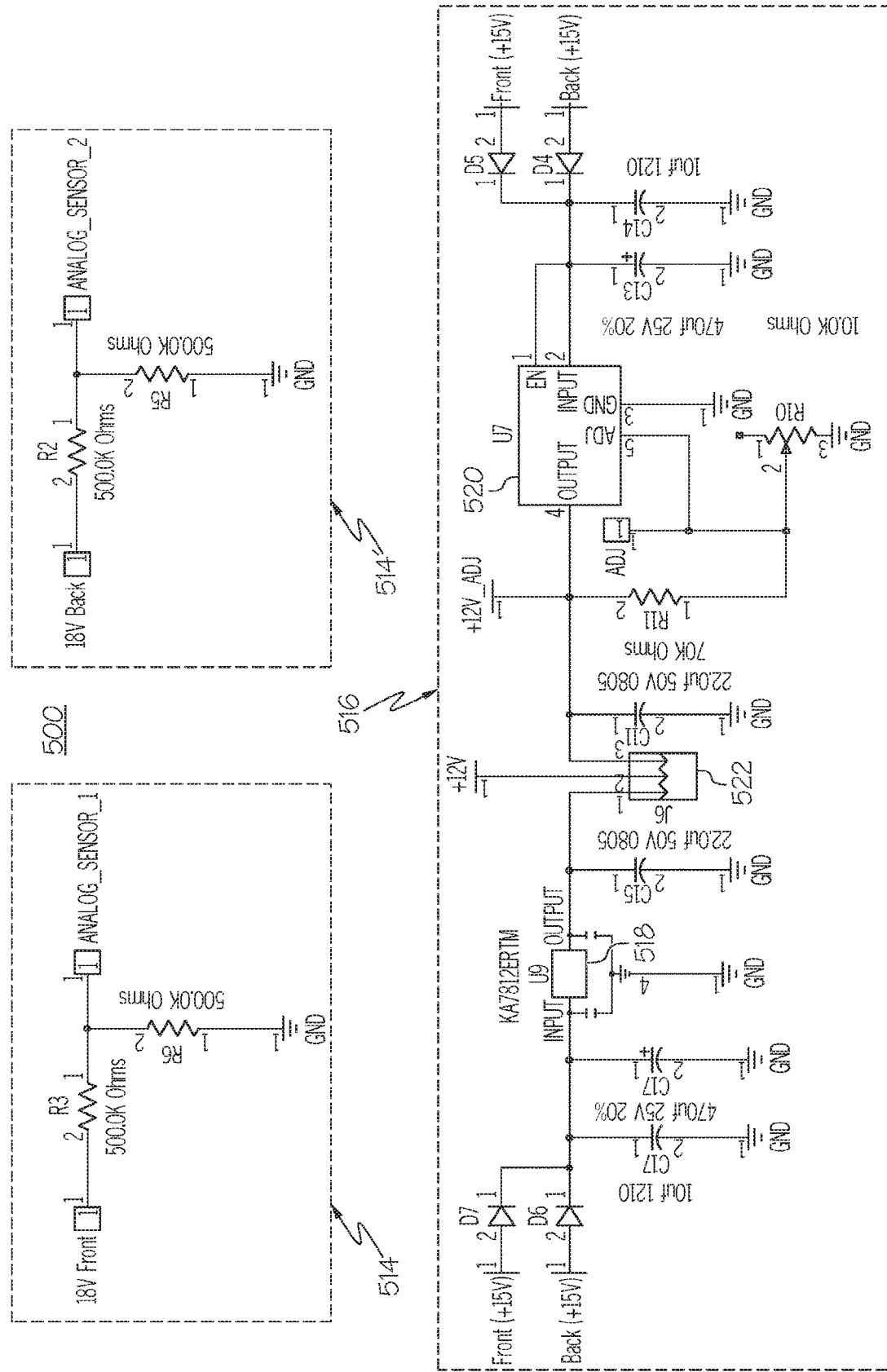
FIG. 5C depicts a circuit diagram of illustrative sub-circuits of electronics for a cart-computing device according to embodiments described herein.

As shown in FIG. 5C, the PIC microcontroller 228, through a voltage divider circuit 514 and 514' and separate analog sense interfaces of the PIC microcontroller 228, is electrically coupled to one of the wheels 222 (e.g., the wires or electrical pick-up coupled to the wheel 222) of each of the pair of front wheels (e.g., 222a and 222c) and the pair of back wheels (e.g., 222b and 222d). In some embodiments, the analog sensor interface, which is communicatively coupled to the wheels 222 of the industrial cart 104, may receive communication signals embedded with the electrical power signals transmitted via the track 102 to the industrial cart 104.

Still referring to circuit diagram 500, FIG. 5C further depicts a sub-circuit 516 for converting the 15-volt output voltage 512 and 512' (from FIG. 5B) to a 12-volt output voltage as depicted in sub-circuit 516. Sub-circuit 516 includes a 12-volt regulator 518 circuit and an adjustable 12-volt regulator circuit 520. In some embodiments, a 12-volt source from the 12-volt regulator 518 may be sufficient. In some embodiments, a more finely tuned 12-volt source may be required. Therefore, the 12-volt source may be drawn from the output of the adjustable 12-volt regulator circuit 520. In some embodiments, this may be accomplished by adjusting a jumper on a set of header pins, for example, at junction 522.

Figure 5D:
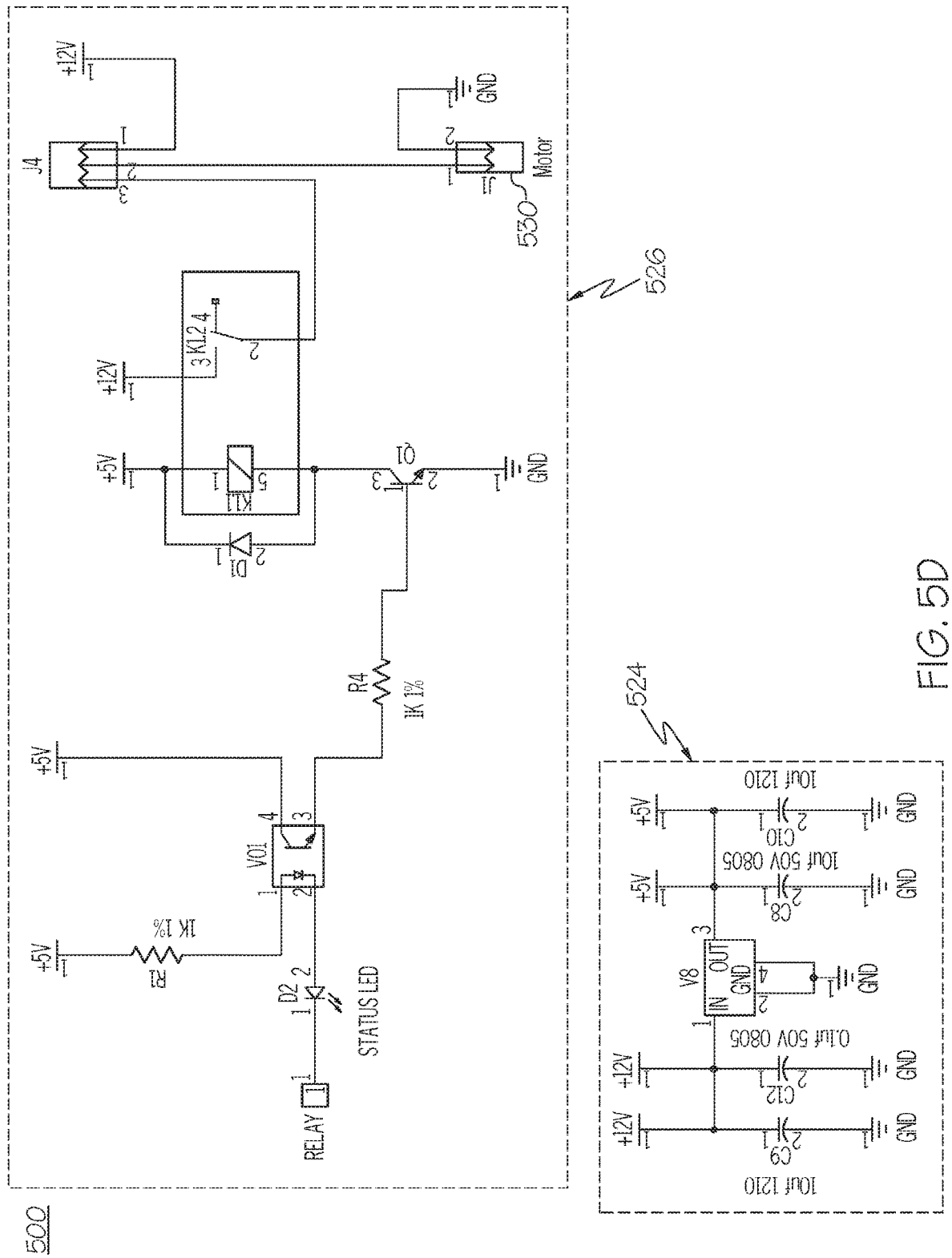
FIG. 5D depicts a circuit diagram of illustrative sub-circuits of electronics for a cart-computing device according to embodiments described herein.

Still referring to circuit diagram 500, FIG. 5D further depicts a sub-circuit 516 Sub-circuit 524 depicts another voltage regulator circuit. Sub-circuit 524 converts the 12-volt source to a 5-volt source using a 5-volt voltage regulator. Each of the various voltage sources are utilized by various components of the circuit for the industrial cart 104. Sub-circuit 526 depicts a motor control circuit. The motor control circuit is coupled with the PIC microcontroller 228 for controlling the operation of the motor, which is electrically coupled to junction 530. Sub-circuit 526 may receive a control signal from the PIC microcontroller 228 and through an optocoupler and other circuit components activate or deactivate the motor.

Figure 5E:
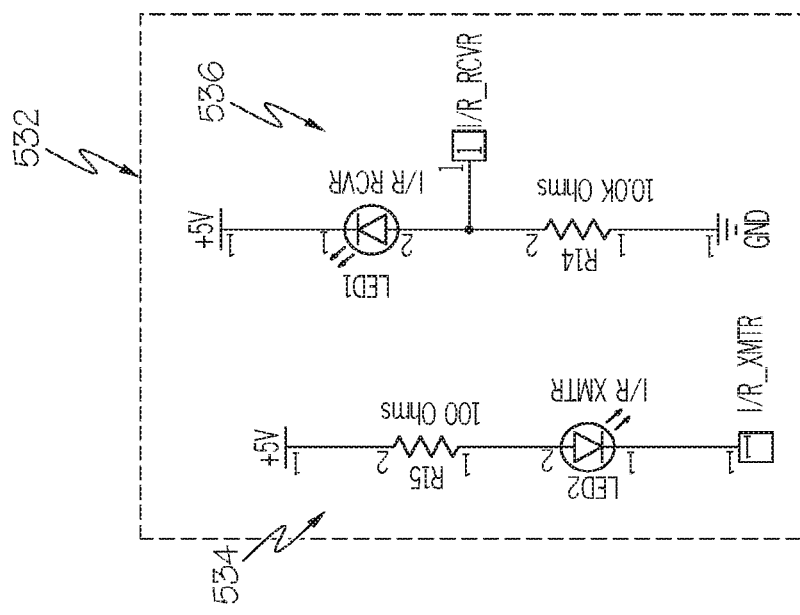
FIG. 5E depicts a circuit diagram of illustrative sub-circuits of electronics for a cart-computing device according to embodiments described herein.

As further depicted in the circuit diagram 500 and depicted in FIG. 5E, the PIC microcontroller 228 is communicatively coupled to an IR transceiver circuit 532. The IR transceiver circuit 532 includes an IR transmitter circuit 534 and an IR receiver circuit 536. As described herein, the IR sensors and receivers may be implemented to sense other industrial carts 104 or location markers 324 on the track 102. Additionally, IR sensors and receivers may be implemented to provide communication to and from the industrial cart 104. Although circuit diagram 500 depicts only one IR transceiver circuit 532 having an IR transmitter circuit 534 and an IR receiver circuit 536, in some embodiments, the industrial cart 104 may include one or more IR transceiver circuits 532 or other type of sensor circuits. These sensors may include the leading sensor 232, the trailing sensor 234, and/or the orthogonal sensor 236 as described herein.

Figure 6:
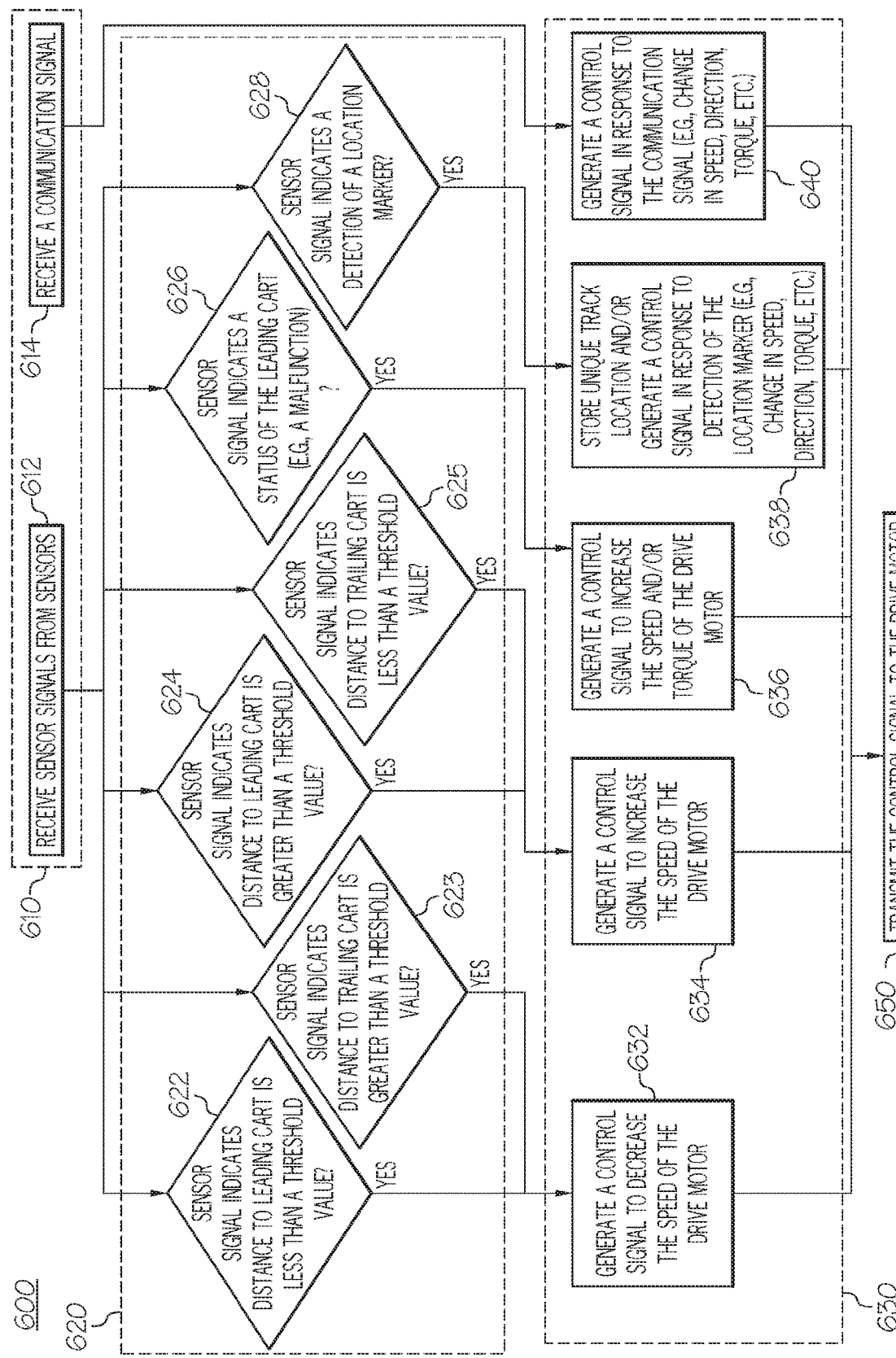
FIG. 6 depicts a flowchart of an illustrative method of controlling an industrial cart in a grow pod assembly according to embodiments described herein.

FIG. 6 depicts a flowchart 600 of an illustrative method of controlling an industrial cart 104 in a grow pod assembly. Elements of the flowchart 600 may be encoded one or more of the logic elements described herein, for example, the operating logic 432, the communication logic 434 and/or the power logic 436. Additionally, the elements of the flowchart 600 may be executed by the processor 410 of the cart-computing device 228, the master controller 106 and/or the associated circuitry, for example, by the electronics of the industrial cart 104 (FIG. 1) as depicted and described with respect FIG. 5A-5E.

Referring to FIGS. 1, 3, and 6, the method depicted in flowchart 600 generally includes receiving signals at block 610, determining what the signal indicates at block 620, generating a signal in response to the received signal at block 630, and transmitting the generated control signal to the drive motor 226 at block 650 in some embodiments. For example, at block 610, the cart-computing device 228 may receive sensor signals from the one or more sensors (e.g., 232, 234, and 236) at block 612 and/or receive a communication signal at block 614. As discussed above, the one or more sensors (e.g., 232, 234, and 236) may include the leading sensor 232, the trailing sensor 234, and the orthogonal sensor 236 on the industrial cart 104. Additionally, the cart-computing device 228 may receive one or more communication signals via the track 102 and wheels 222 from the master controller 106. At block 620, the received signals are analyzed by the processor 410 and logic steps are executed to determine whether the drive motor 226 should be adjusted in response to the sensor signals.

As described above, if the sensor signal indicates a distance that is greater or less than a threshold value the cart-computing device 228 may determine that the drive motor 226 needs to be adjusted. For example, if the sensor signal indicates that the distance to the leading cart is less than a threshold value, at block 622, or if the distance to the trailing cart is greater than a threshold value, at block 623, then the cart-computing device 228 may determine that the speed of the drive motor 226 needs to be decreased. For example, the cart-computing device 228 may generate a first control signal that decreases a speed of the drive motor when the distance to the leading cart is less than (or below) a threshold value or when the distance to the trailing cart is greater than (or above) a threshold value. Similarly, if the sensor signal indicates that the distance to the leading cart is greater than a threshold value, at block 624, or if the distance to the trailing cart is less than a threshold value, at block 625, then the cart-computing device 228 may determine that the speed of the drive motor 226 needs to be increased. For example, the cart-computing device 228 may generate a second control signal that increases a speed of the drive motor when the distance to the leading cart is greater than (or above) a threshold value or when the distance to the trailing cart is less than (or below) a threshold value.

If the sensor signal indicates that a leading cart has malfunctioned, at block 626, then the cart-computing device 228 may determine that the speed and/or torque of the drive motor 226 needs to be increased to compensate for having to push the leading cart.

In the event the sensor signal indicates the detection of a location marker 324, the cart-computing device 228 may preform one or several functions. In some embodiments, where the location marker 324 indicates a particular location along the track 102, the cart-computing device 228 may store, in memory component 430 (FIG. 4), the unique ID that the sensor detected. In some embodiments, the detection of the location marker 324 by the sensor may cause the cart-computing device 228 to adjust one of the speed, the direction, the torque, or other parameter of the drive motor 226. That is, at block 638, the cart-computing device 228 may generate the control signal to carry out the determined adjustment to the drive motor 226. In some embodiments, the cart-computing device 228 may store the unique ID as indicted by the received sensor signal and generate a control signal to adjust the functionality of the drive motor 226.

At block 630, the cart-computing device 228 and/or other electronic circuitry coupled to the cart-computing device 228 and the drive motor 226 may generate the necessary control signal for adjusting the functionality of the drive motor 226. At block 632, the generated control signal may decrease the speed of the drive motor 226 in response to the determination at block 622 and/or block 623. At block 634, the generated control signal may increase the speed of the drive motor 226 in response to the determination at block 624 and/or block 625. At block 636, the generated control signal may increase the speed and/or the torque of the drive motor 226 in response to the determination of a malfunction at block 626. At block 638, the generated control signal may change the speed, the direction, the torque and/or other attribute of the drive motor 226 in response to a communication signal received at block 614. For example, the communication signal may be from the master controller 106.

As described above, the control signal is transmitted to the drive motor 226, at block 650, from the cart-computing device 228 and through the electronic circuitry depicted in the circuit diagram 500, which couples the drive motor 226 to the cart-computing device 228.

As illustrated above, various embodiments of systems and methods for providing an industrial cart for a grow pod are disclosed. These embodiments allow for a plurality of industrial carts to independently traverse a track of a grow pod to provide individual care to each industrial cart and/or each plant.

Accordingly, embodiments include systems and/or methods for providing an industrial cart for a grow pod that includes a tray and a cart-computing device that cause the industrial cart to operate in response to one or more sensor signals and/or communication signals. The one or more sensor signals may be received from the one or more sensors on the industrial cart. The one or more sensors may detect events such as the distance between adjacent industrial carts on the track, location markers indicating particular locations along the track and/or other communications from adjacent carts such as that an adjacent industrial cart has malfunctioned. The communication signals may be received via the track and wheel coupled to the industrial cart and may provide commands or information from the master controller. In response to the one or more sensor signals and/or communication signals, the cart-computing device may adjust the operation of the drive motor of the industrial cart.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein include systems, methods, and non-transitory computer-readable mediums for communicating with an industrial cart. It should also be understood that these embodiments are merely exemplary and are not intended to limit the scope of this disclosure.

What is claimed is:

1. A cart comprising:
a wheel; and
a cart-computing device communicatively coupled to the wheel;
wherein:
the cart-computing device receives an electrical signal via the wheel, wherein the electrical signal comprises a communication signal and electrical power,
the communication signal corresponds to one or more instructions for controlling an operation of the cart, and
the electrical power of the electrical signal powers the cart-computing device.

2. The cart of claim 1, further comprising a drive motor communicatively coupled to the cart-computing device, wherein an output of the drive motor causes the wheel to rotate and propel the cart, and
wherein:
the cart-computing device generates and transmits a control signal to the drive motor to cause the drive motor to operate based on at least one of one or more signals generated by the communication signal.

3. The cart of claim 2, wherein the wheel electrically couples with the drive motor and the cart-computing device such that the electrical power received by the wheel powers the drive motor and the cart-computing device.

4. The cart of claim 2, wherein the communication signal corresponds to one or more instructions that cause the drive motor to operate at a speed and a direction.

5. The cart of claim 2, wherein the control signal generated by the cart-computing device causes the drive motor to operate at a speed and a direction.

6. The cart of claim 2, further comprising one or more sensors communicatively coupled to the cart-computing device, the one or more sensors generating one or more signals in response to a detected signal, and
wherein:
the cart-computing device receives one or more signals from the one or more sensors, and
the cart-computing device generates and transmits a control signal to the drive motor to cause the drive motor to operate based on at least one of the one or more signals generated by the one or more sensors or the communication signal.

7. The cart of claim 6, wherein the one or more signals generated by the one or more sensors include a signal indicative of a distance between the one or more sensors and the detected event.

8. The cart of claim 6, wherein the detected event corresponds to detecting, with the one or more sensors, a presence of a second cart and the one or more signals generated by the one or more sensors include a signal indicative of a distance between the cart and the second cart.

9. The cart of claim 6, wherein the detected event corresponds to detecting, with the one or more sensors, detection of a location marker and the one or more signals generated by the one or more sensors indicate a particular location identified by the location marker.

10. The cart of claim 6, wherein:
the one or more sensors include a trailing sensor coupled to the cart to generate the one or more signals in response to the detected event behind the cart,
the detected event corresponds to detection of a presence of a trailing cart behind the cart,
the one or more sensors generate the one or more signals that include a signal indicative of a distance between the cart and the trailing cart, and
in response to the one or more signals, the cart-computing device generates a first control signal that decreases a speed of the drive motor when the distance between the cart and the trailing cart is above a threshold value and the cart-computing device generates a second control signal that increases the speed of the drive motor when the distance between the cart and the trailing cart is below the threshold value.

11. The cart of claim 6, wherein:
the one or more sensors include a leading sensor coupled to the cart to generate the one or more signals in response to the detected event in front of the cart,
the detected event corresponds to detection of a presence of a leading cart in front of the cart,
the one or more sensors generate the one or more signals that include a signal indicative of a distance between the cart and the leading cart, and
in response to the one or more signals, the cart-computing device generates a first control signal that decreases a speed of the drive motor when the distance between the cart and the leading cart is below a threshold value and the cart-computing device generates a second control signal that increases the speed of the drive motor when the distance between the cart and the leading cart is above the threshold value.

12. The cart of claim 1, wherein the cart includes a tray for growing at least one of the following: a plant, a seedling, or a seed.

13. A system comprising:
a track;
a master controller communicatively coupled to the track; and
a plurality of carts supported on the track, at least one cart of the plurality of carts comprising:
a wheel supported on the track and electrically coupled to the track, and
a cart-computing device communicatively coupled to the wheel, wherein:
the cart-computing device receives, via the track and the wheel, an electrical signal wherein the electrical signal comprises a communication signal transmitted from the master controller and electrical power,
the communication signal, generated by the master controller, corresponds to one or more instructions for controlling an operation of the at least one cart, and
the electrical power of the electrical signal powers the cart-computing device.

14. The system of claim 13, further comprising a drive motor communicatively coupled to the cart-computing device, wherein an output of the drive motor causes the wheel to rotate and propel the cart, and
wherein:
the cart-computing device generates and transmits a control signal to the drive motor to cause the drive motor to operate based on at least one of one or more signals generated by the communication signal.

15. The system of claim 14, wherein the wheel electrically couples with the drive motor and the cart-computing device such that the electrical power from the track powers the drive motor and the cart-computing device.

16. The system of claim 14, wherein the communication signal, transmitted by the master controller to the cart-computing device of the at least one cart via the track and the wheel of the at least one cart, corresponds to one or more instructions that cause the drive motor to operate at a speed and a direction.

17. The system of claim 14, wherein the track further comprises a first electrically conductive portion and a second electrically conductive portion separated by a non-conductive portion such that the first electrically conductive portion transmits a first electrical power signal that is separate from a second electrical power signal transmitted by the second electrically conductive portion and the at least one cart is configured to select either electrical power from either the first electrical power signal or the second electrical power signal when traversing the track from the first electrically conductive portion to the second electrically conductive portion.

18. The system of claim 14, further comprising one or more sensors communicatively coupled to the cart-computing device, the one or more sensors generating one or more signals in response to a detected signal, and
wherein:
the cart-computing device receives one or more signals from the one or more sensors, and
the cart-computing device generates and transmits a control signal to the drive motor to cause the drive motor to operate based on at least one of the one or more signals generated by the one or more sensors or the communication signal.

19. The system of claim 18, wherein:
a leading cart of the plurality of carts is positioned behind a trailing cart of the plurality of carts on the track,
the one or more sensors of the leading cart detect a presence of the trailing cart and generate the one or more signals indicative of a distance between the leading cart and the trailing cart,
the cart-computing device of the leading cart receives the one or more signals from the one or more sensors and, in response, adjusts the operation of the drive motor through the control signal,
the control signal generated by the cart-computing device causes the drive motor of the leading cart to decrease in speed, when the distance between the leading cart and the trailing cart is above a threshold value, and the control signal generated by the cart-computing device causes the drive motor to increase in speed, when the distance between the leading cart and the trailing cart is below the threshold value.

20. The system of claim 18, wherein:

a leading cart of the plurality of carts is positioned in front of a trailing cart of the plurality of carts on the track, the one or more sensors of the leading cart detect a presence of the trailing cart and generate the one or more signals indicative of a distance between the leading cart and the trailing cart, the cart-computing device of the leading cart receives the one or more signals from the one or more sensors and in response adjusts the operation of the drive motor through the control signal, the control signal generated by the cart-computing device causes the drive motor of the leading cart to decrease in speed, when the distance between the leading cart and the trailing cart is above a threshold value, and the control signal generated by the cart-computing device causes the drive motor to increase in speed, when the distance between the leading cart and the trailing cart is below the threshold value.

\* \* \* \* \*